(12) United States Patent
Downey et al.

(10) Patent No.: US 9,896,836 B1
(45) Date of Patent: Feb. 20, 2018

(54) APPARATUS, METHOD, AND SYSTEM FOR HIGH CAPACITY BAND BRAKE TYPE VARIABLE FRICTION DAMPING OF MOVEMENT OF STRUCTURES

(71) Applicants: IOWA STATE UNIVERSITY RESEARCH FOUNDATION, INC., Ames, IA (US); TAYLOR DEVICES, INC., North Tonawanda, NY (US)

(72) Inventors: Austin Downey, Ames, IA (US); Simon Laflamme, Ankeny, IA (US); Douglas P. Taylor, North Tonawanda, NY (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 14/936,357

(22) Filed: Nov. 9, 2015

(51) Int. Cl.
E04B 1/98 (2006.01)
F16F 7/06 (2006.01)

(52) U.S. Cl.
CPC ............... *E04B 1/985* (2013.01); *E04B 1/98* (2013.01)

(58) Field of Classification Search
CPC .... E04B 1/98; E04B 1/985; F16F 7/06; F16F 7/065; F16F 2232/06

(Continued)

(56) References Cited

U.S. PATENT DOCUMENTS 1,413,292 A 4/1922 Rauscher
2,179,543 A * 11/1939 Clements ................ F16D 49/08
188/77 R (Continued)

FOREIGN PATENT DOCUMENTS

DE 19938626 A1 * 7/2001 ............... F16F 7/02
FR 2329898 A1 * 5/1977 ............... B41J 7/32

(Continued)

OTHER PUBLICATIONS

Bremskerl, "Friction Material Products, Industrial Applications Commercial Vehicles, Non-Asbestos REACH, GADSL & RoHS Compliant Materials, Manufacturer of High Quality Friction Materials Since 1929", Product Catalog, available at www.bremskerl.com, 40 pages, 2013.

(Continued)

*Primary Examiner* — Thomas J Williams
(74) *Attorney, Agent, or Firm* — McKee, Voorhees & Sease, PLC

(57) ABSTRACT

Implementation of high performance controllable damping devices can ameliorate cost-effectiveness of structural systems for mitigation of natural hazards relative to structures such as building, wind turbines, and off-shore structures. However, the applications of these damping systems are limited due to a lack of 1) mechanical robustness; 2) electrical reliability; and 3) large resisting force capability. To broaden the implementation of modern damping systems, a semi-active damping device is proposed. The device, in one form termed Banded Rotary Friction Device (BRFD), has enhanced applicability compared to other proposed damping systems due to its cost-effectiveness, high damping performance, mechanical robustness, and technological simplicity. Its mechanical principle is based on a band brake, which results in a high amplification of the input force while enabling a variable control force.

27 Claims, 39 Drawing Sheets

(58) Field of Classification Search
 USPC .................. 188/77 R, 77 W, 65.1, 188
 See application file for complete search history.

(56) References Cited

U.S. PATENT DOCUMENTS

| | | | | |
|---|---|---|---|---|
| 3,203,510 | A | * | 8/1965 | Hillegass ............... F16D 65/04 |
| | | | | 188/77 W |
| 3,531,849 | A | * | 10/1970 | Bishop .................. F16D 49/08 |
| | | | | 24/23 R |
| 4,457,250 | A | | 7/1984 | Oshima et al. |
| 4,953,415 | A | * | 9/1990 | Lehtonen ............ A63B 21/015 |
| | | | | 188/77 R |
| 5,560,161 | A | | 10/1996 | Lou |
| 2004/0222054 | A1 | * | 11/2004 | Okada ................... F16D 49/02 |
| | | | | 188/77 R |

FOREIGN PATENT DOCUMENTS

| | | | | |
|---|---|---|---|---|
| GB | 878978 | A | * 10/1961 | ............. B61G 11/14 |
| JP | 01087933 | A | * 4/1989 | |

OTHER PUBLICATIONS

Honeywell, "Model 41, Precision Low Profile Load Cell", Product Data Sheet, available at www.honeywell.com/sensing, 008609-3-EN IL50 GLO, 6 pages, Jun. 2013.

Enerpac Powerful Solutions, Global Force, "RSM/RCS-Series, Low Height Cylinders; Single-Acting Low Height Cylinders", Product Data Sheet, available at www.enerpac.com, pp. 22-23.

Wikipedia, The Free Encyclopedia, "Floating Wind Turbine", Retrieved From "https://en.wikipedia.org/w/index.php?title=Floating_wind_turbine&oldid=682405482", Sep. 24, 2015, 8 pages.

Cao, Liang, et al., "A Novel Variable Friction Device for Natural Hazard Mitigation", 10th U.S. National Conference on Earthquake Engineering, Frontiers of Earthquake Engineering, Jul. 21-25, 2014, Anchorage, Alaska, 11 pages.

* cited by examiner

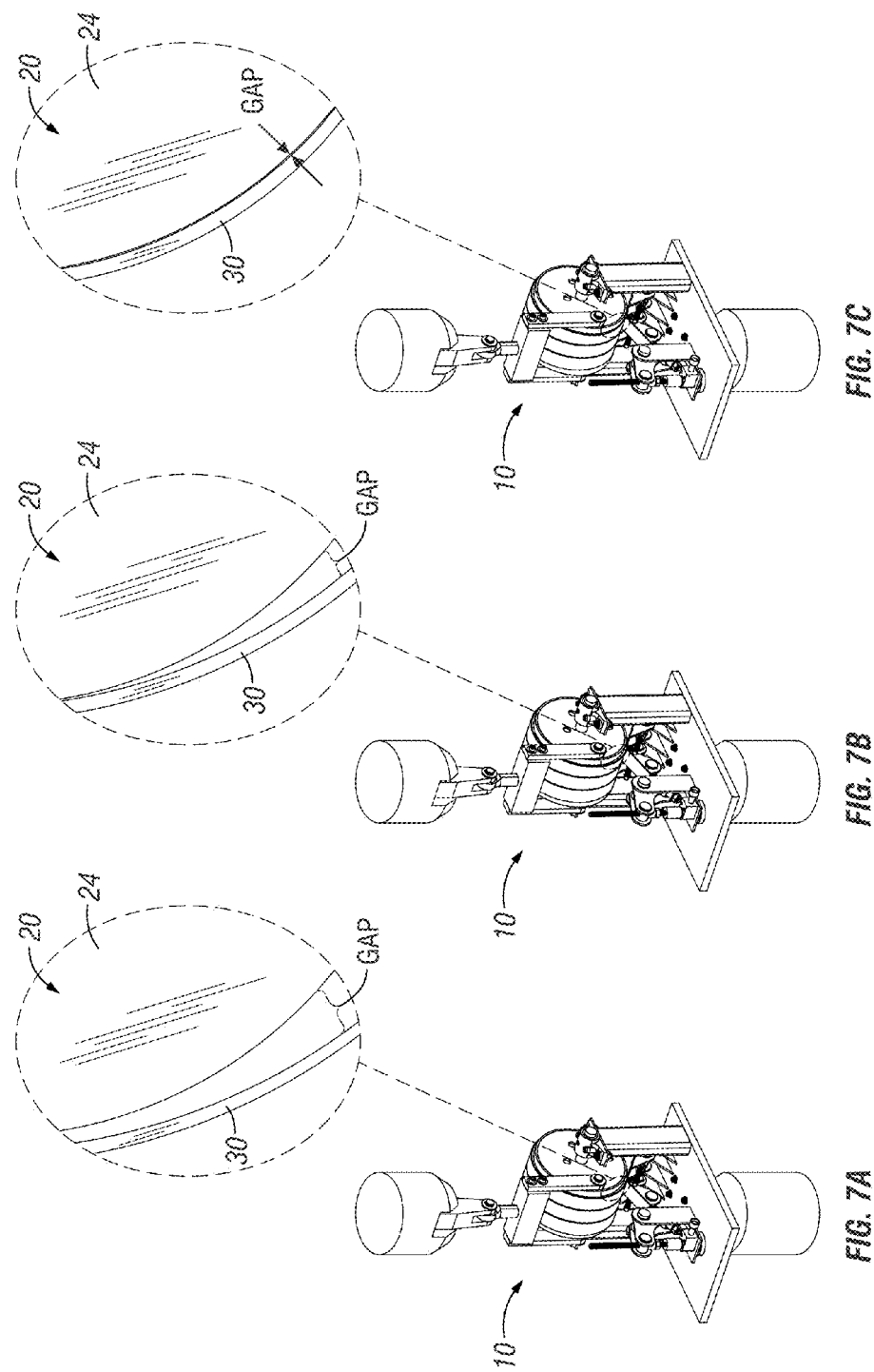

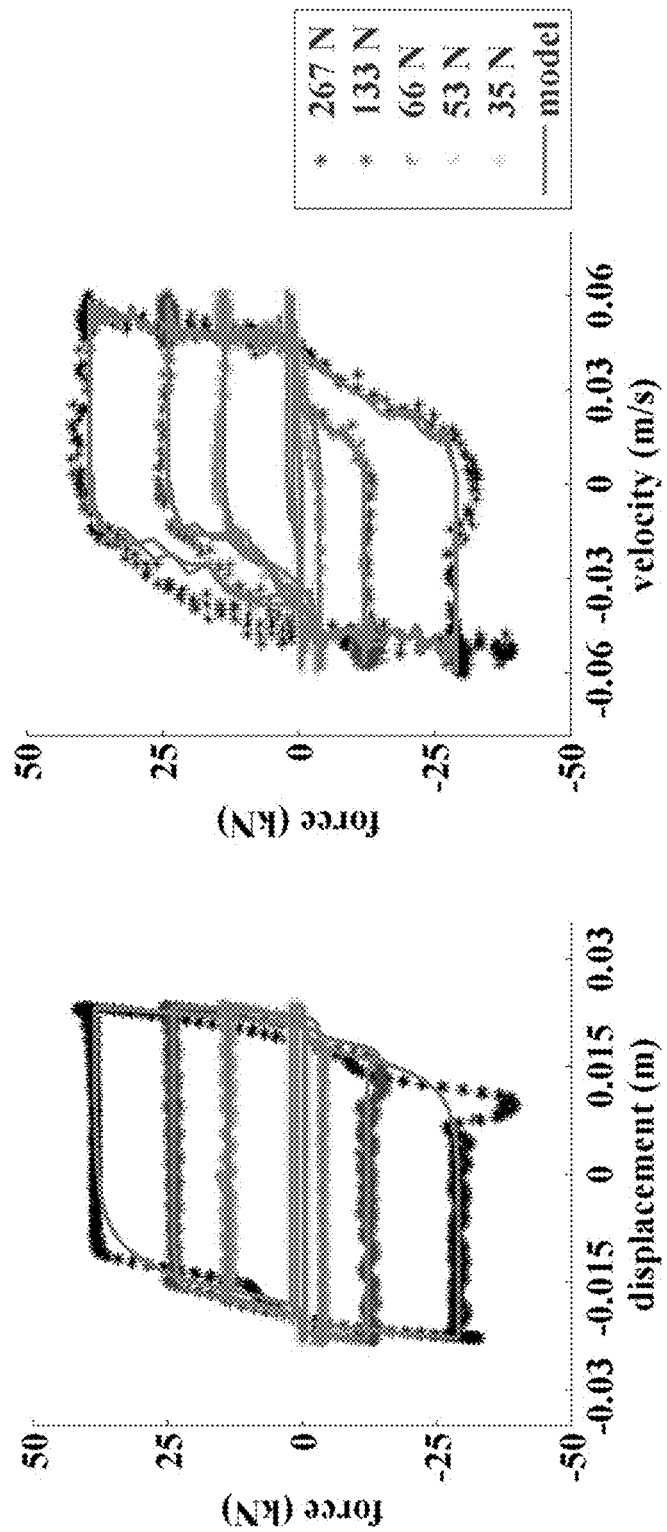

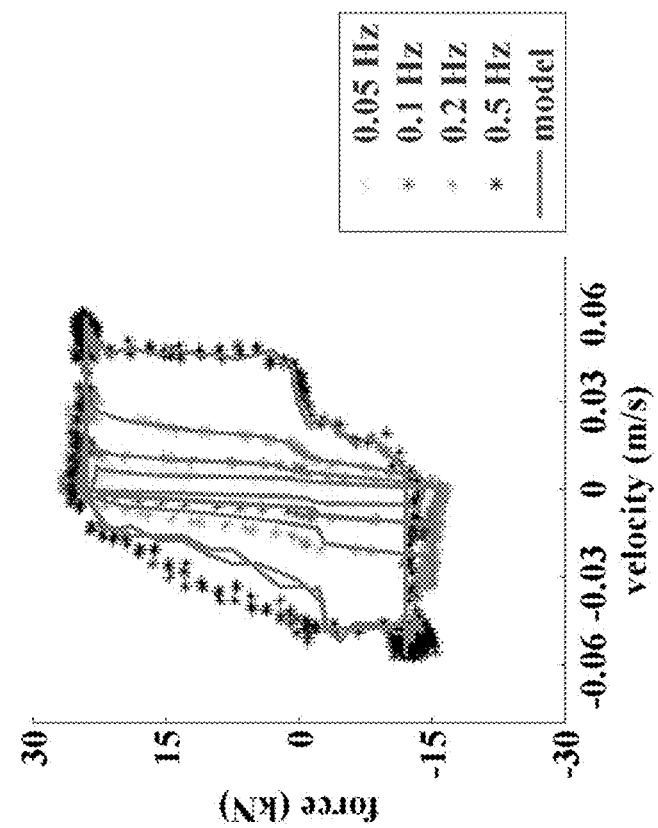
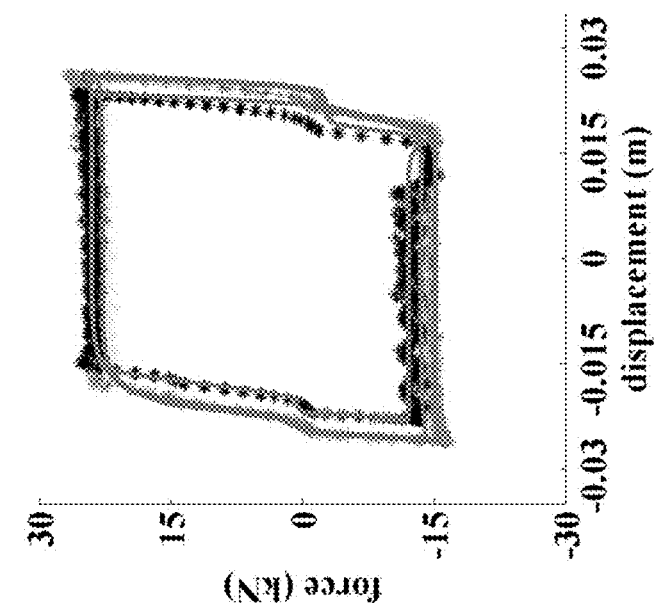
FIG. 10A
FIG. 10B

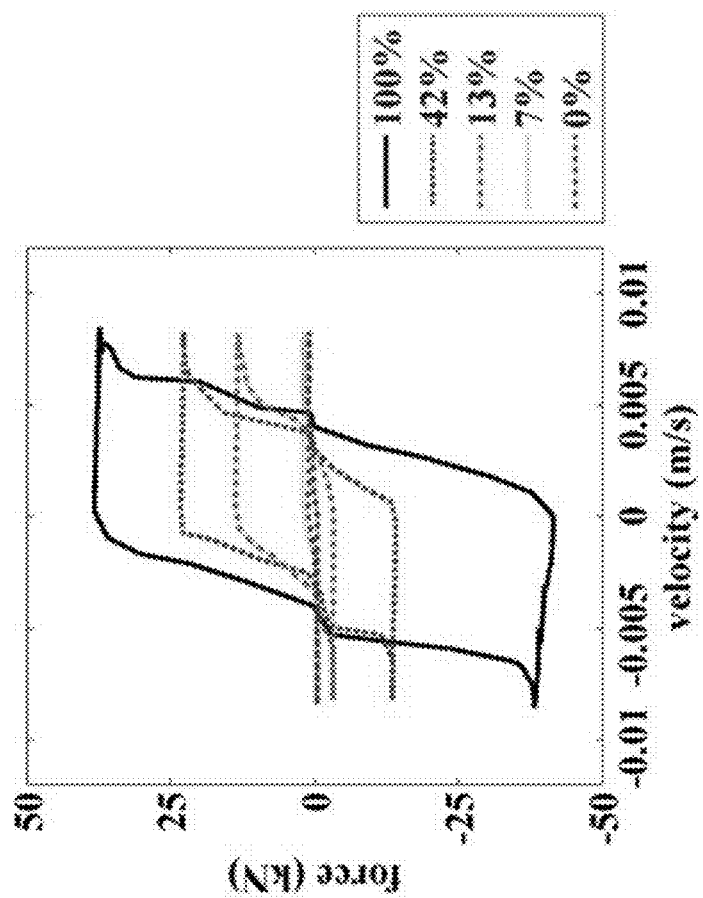
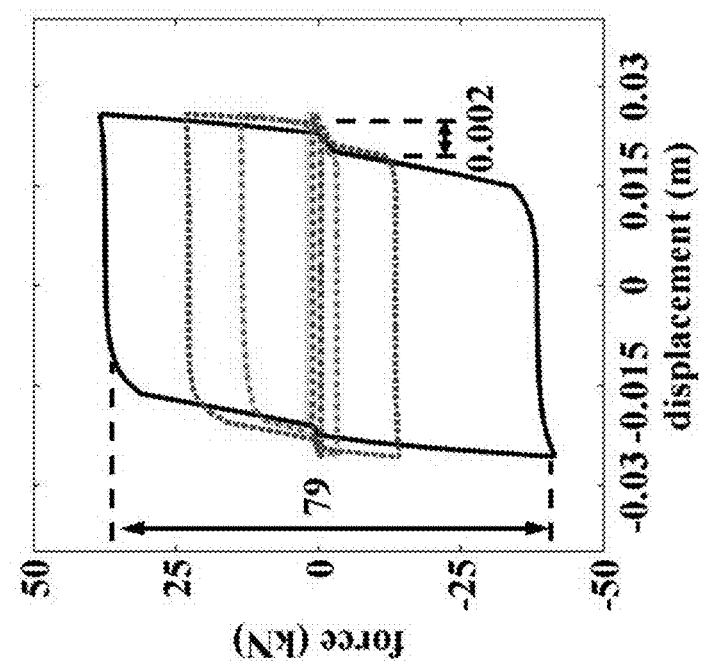
FIG. 11B
FIG. 11A

Axle

Side of Brake Drum

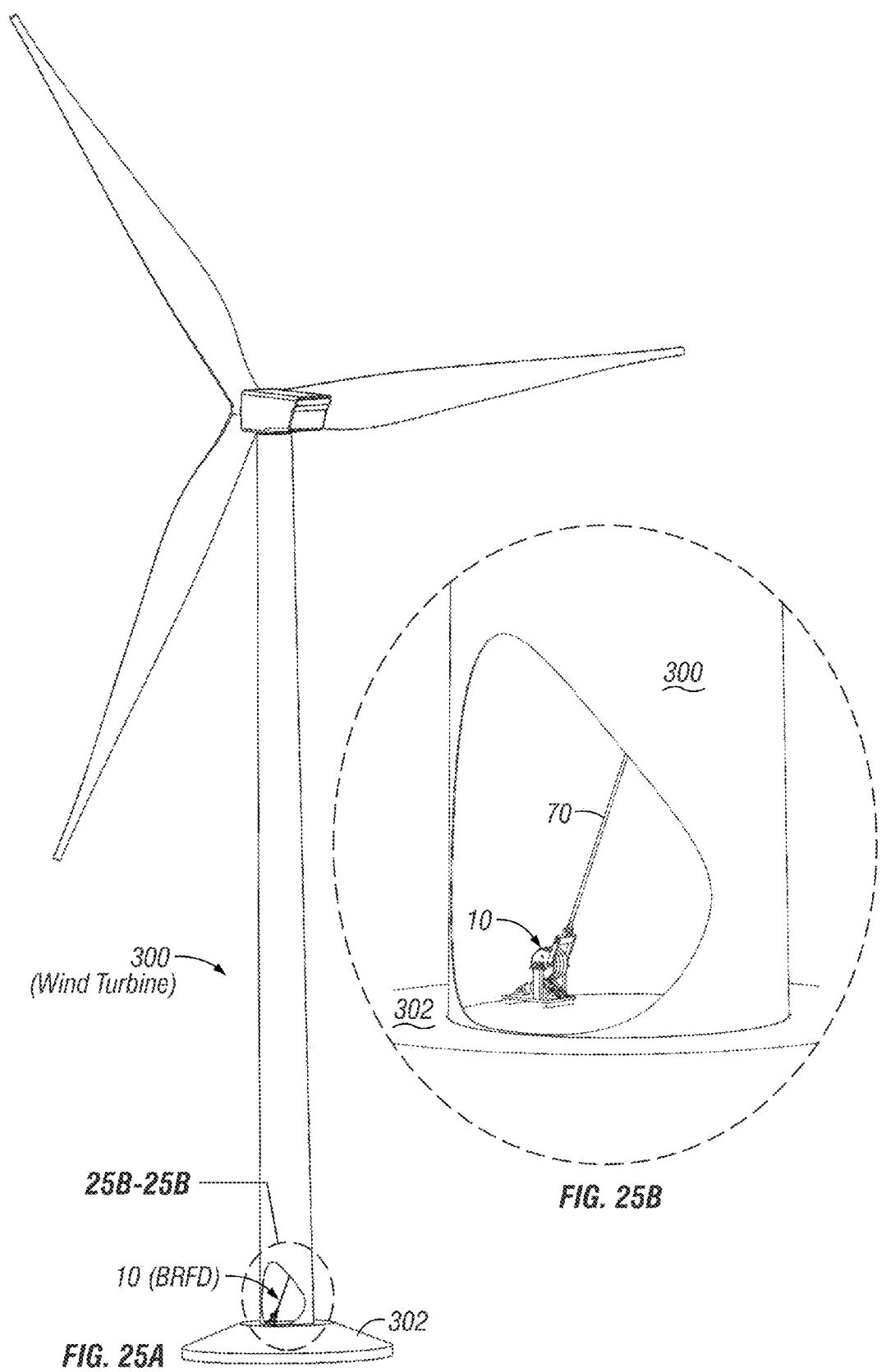

APPARATUS, METHOD, AND SYSTEM FOR HIGH CAPACITY BAND BRAKE TYPE VARIABLE FRICTION DAMPING OF MOVEMENT OF STRUCTURES

GRANT REFERENCE

This invention was made with government support under Grant No. CMMI1300960 awarded by the National Science Foundation. The government has certain rights in the invention.

I. BACKGROUND OF THE INVENTION

A. Field of the Invention

The present invention relates to damping of structures against movement such as can be caused by, for example, wind, earthquakes, or other forces. Movement can include directional movement, vibration, and oscillation. In particular, the invention relates to a system using a band brake configuration friction device in combination with the structure's structural system. The system can includes a control mechanism to adjust damping force. The band-brake-type friction device can be used in combination with other types of damping devices.

B. Problems in the Art

A variety of techniques have been proposed for mitigation of building movement of these types. Some are called passive in the sense that they based primarily on mechanical, reactionary components. They do not require external power sources. Some are entitled active. They require external power sources. Some are denominated as semi-active and combine aspects of passive and active. State-of-the-art systems of all three categories are well-known. The literature is mature regarding the same.

The spectrum of approaches indicates the complexity of the matter. At stake is avoidance of potential destructive effects on structures that can range from small single story buildings to massive multi-storied skyscrapers caused by such things as wind or seismic events. A variety of factors influence the designs. Some of these factors can be antagonistic.

For example, ability to withstand massive event forces implicates more robust, possible larger and more expensive dampers. Yet, the building may present practical space and cost constraints. Another example is useful life of the damper. Some state-of-the-art dampers have a failure point. This implicates the risk that the damper will have to be repaired or replaced after each event. Another issue involves ability to provide damping protection for forces that tend to oscillate a structure. Ideally, damping protection should be continuous and for both directions of oscillation. Also, it can be beneficial, but not necessarily easy, to control the damper with input forces which are a small fraction of the potential damping forces. It may also be difficult to scale some damping approaches up and down in a practical, economic way. Thus, a variety of approaches for mitigation have arisen. There are pros and cons to each.

Some state-of-the-art approaches are not controllable in the sense that the amount of damping force cannot be adjusted. On the other hand, some controllable damper systems require substantial external power supplies or substantial external forces to operate. Some are large in size and take substantial valuable space. Some have high cost and/or complexity. Also, some fail or have a destructible component when experiencing large forces, and thus must be repaired or replaced after each such event. These issues can exist for both base-isolation and non-base isolation building designs.

Similar issues exist for other engineered earth-supported structures that support or resist relatively large loads. Examples include but are not limited to bridges, wind turbines, and off-shore structures, whether or not using base-isolation, inertial, or other paradigms. This can include structures that are not necessarily in the ground but, for example anchored to the ground. One example would be a floating offshore structure. This can also include what are well known in the art as tuned mass isolation systems on structures including but not limited to tall buildings or bridges. An example of a tuned mass damper is described at U.S. Pat. No. 5,560,161, which is incorporated by reference herein.

Some approaches utilize friction as the damping force. One proposed example is in the form of a drum brake of the style used in some automobiles. Drum shoes are controlled against the interior of a drum. Friction of the shoes against the interior of the drum damps forces trying to rotate the brake drum. However, the inventors have identified issues with this friction device when applied to damping building or other structure movement. For example, these style of devices may not be able to generate the range of damping forces needed, or at least a practical ratio of input force to damping force. They may not be able to effectively provide consistent damping of building or structure oscillation events. They may not be able to survive multiple severe events. They are not easily scalable, especially for much larger scales.

There is, therefore, room for improvement in this technical art.

II. SUMMARY OF THE INVENTION

As a result, the present invention relates to the method, apparatus, and system for damping movement of a structure which improves over or solves problems and deficiencies in the art.

Other objects, features, aspects, or advantages of the present invention include the method, apparatus, and system as above described which:

a. Can be implemented in a semi-active manner, including having a self-energizing nature.

b. Can be effectively scaled up and down according to need and desire.

c. Can be controlled, tuned, or adjusted to provide variable and high capacity damping forces, including for different conditions, without much input force.

d. Can be installed with respect to different structures and structural systems, such as bracing paradigms, isolation paradigms, inertia paradigms, including with other damping devices, in a complementary fashion.

e. Can withstand a wide range of forces, including relatively large excitation forces.

f. Utilizes a band-brake paradigm to supply friction to dampen excitation forces.

g. Can be implemented in relatively economical components and installations.

h. Can function through multiple events and provide a relatively long useful life.

i. Is relatively non-complex.

These and other objects, features, aspects, or advantages of the present invention will become more apparent with reference to the accompanying specification and claims.

In one aspect of the invention, a method of damping movement such as displacement or vibration of a structure comprises transferring displacement via a bracing system or other tie-in to or associated with the structure into a rotation, and resisting the rotation with a variable frictional force generated by a flexible band lined with friction material and anchored at one end. The band is wrapped around a rotatable drum with the other end of the band applying a tangential force on the drum. A control system, utilizing a relatively small amount of force in comparison to the frictional force that can be created, adjusts the relationship of the band to the drum. A positive servo or self-energizing effect can be created and controlled in either direction of rotation drum within the band.

In another aspect of the invention, the method is implemented in a band brake type apparatus which has a frame which supports a rotating drum or wheel. In cases where the structure is a building, in one example the rotating drum or wheel can be mounted or fixed to a building base or foundation which supports at least one floor deck above it. It is possible to position the drum in other positions at or in the building. Such positions can be horizontal, vertical, or oblique relative to portions of the structure. A band, having a frictional side, is wrapped around the drum or wheel. Opposite ends of the band are secured to the frame. A linkage between the drum and a building bracing member or other tie-in to the building is adapted such that movement of the building super-structure translates such movement to rotational movement of the drum or wheel. The wrapped band resists or opposes drum rotation by friction. Damping action is thus imparted against building movement. A control system allows adjustment of the band relative the drum or wheel. The method can be implemented relative to other relatively large superstructures (e.g. bridges, wind turbines, off-shore structures, etc.) in analogous ways.

Another aspect of the invention is utilizing the method or apparatus in a system comprising a building having a substantial vertical axis. One or more floor decks are supported on vertical structural members on a building base. One or more band brake type damping apparatus is/are mounted at the building base and operatively connected between the building base and at least one structural brace member of the building. The damping apparatus comprises a banded rotary friction device that resists building movement by friction between a rotating drum or wheel and a fixed band. In one embodiment of the system, an actuator in operatively connected to the band to adjust its tension with the drum or wheel. The amount of force to adjust the tension is a small fraction of the amount of damping force that can be generated by the band and drum or wheel. The control can provide a range of self-actualizing and self-energizing damping forces for normal events experienced by the structure (e.g. normal wind events) and larger damping forces for abnormal events (e.g. seismic events or severe wind events). Once in place, the system has the capability of operating for many events over time. It does not require a component that is designed to fail, even at or past abnormal event forces. The system can be applied in analogous ways to other structures. A few non-inclusive examples are bridges, wind turbines, and off-shore structures.

The system can include just one band brake type damping apparatus, or plural such apparatus. The system can be installed in buildings or relative to other structures. The system can be installed to address any of a variety of different damping goals.

In another aspect of the invention, a system of the type described above can be combined with other damping devices. For example, a band brake type damping apparatus or system as described above could be installed in parallel with a different type of damping apparatus or system. The latter damping apparatus or system could be adapted to damp normal events. The band brake type apparatus or system could be adapted to address abnormal events. One non-inclusive example of the different type of damping apparatus or system is a hydraulic damper.

In another aspect of the invention, a system of the type described above can be applied to tuned mass isolation systems. For example, a band brake damping apparatus or system could be utilized alone or in combination with other types of dampers for tuned mass isolation systems.

III. BRIEF DESCRIPTION OF THE DRAWINGS

Figure 1:
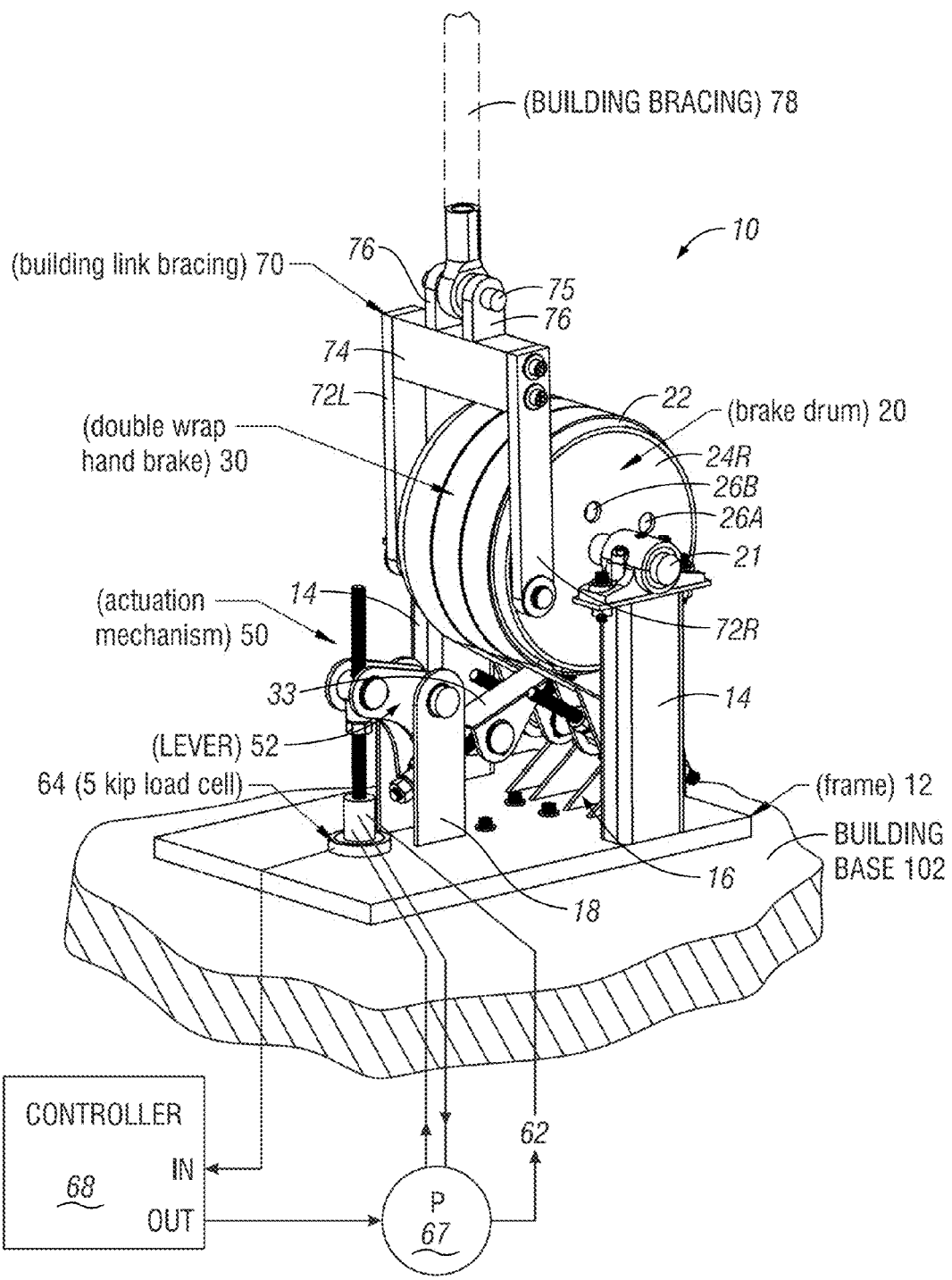
FIG. 1 is a reduced-in-scale perspective view of a banded rotary friction device (BRFD) according to a first exemplary embodiment of the invention with a tension control circuit, a building base or foundation, and a building bracing shown schematically.
Figures 5A, 5B:
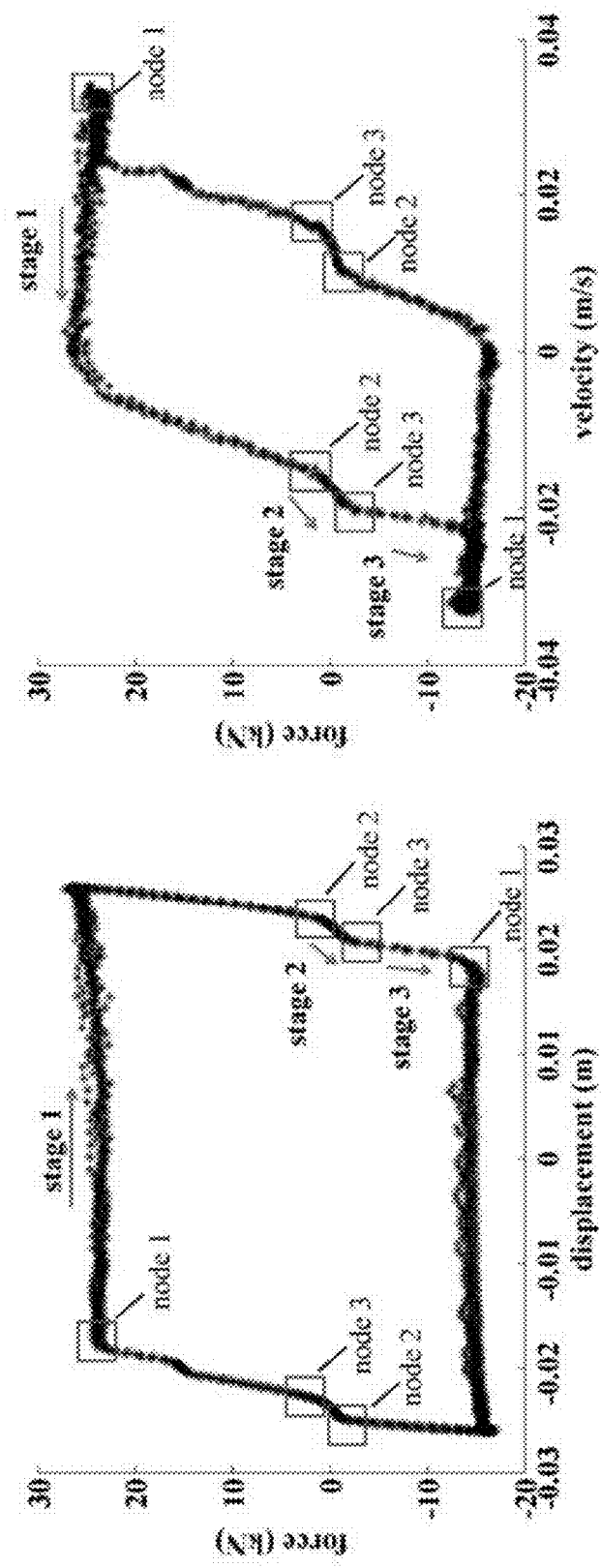

FIGS. 5A and 5B are related graphs showing dynamic response of the BRFD of FIG. 1 under applied force of 133 N (30 lb.). FIG. 5A is a force-displacement plot (0.2 Hz). FIG. 5B is a force-velocity plot (0.2 Hz).

Figure 6:
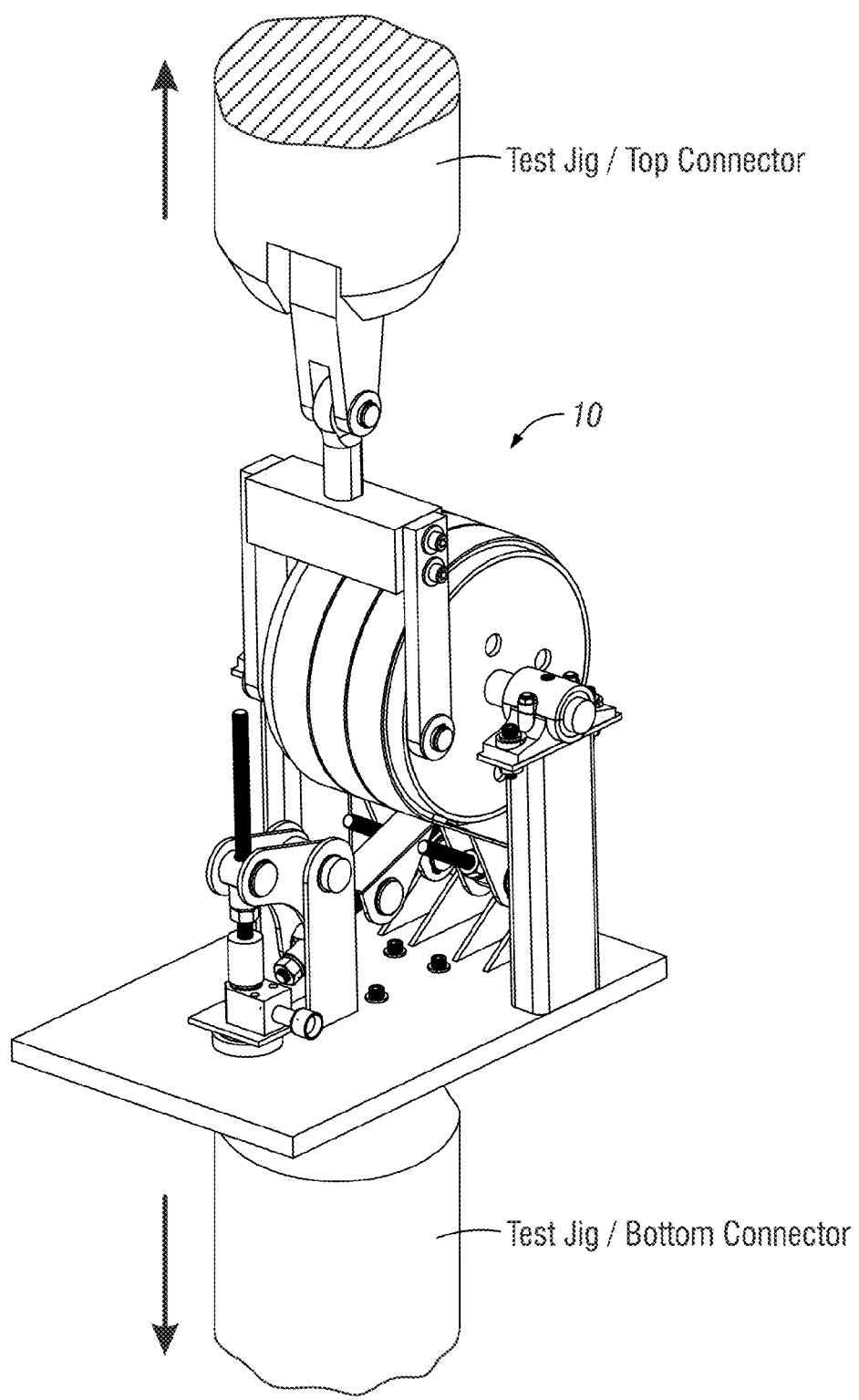

FIG. 6 is a perspective view of the BRFD of FIG. 1 in a testing setup or jig (shown partially).

FIGS. 7A-C are side-by-side comparison illustrations of the BRFD of FIG. 1 illustrating diagrammatically, and not to scale, band gaps varying with applied force, namely, 35N in FIG. 7A, 66 N in FIG. 7B, and 267 N in FIG. 7C.

Figures 8A, 8B:
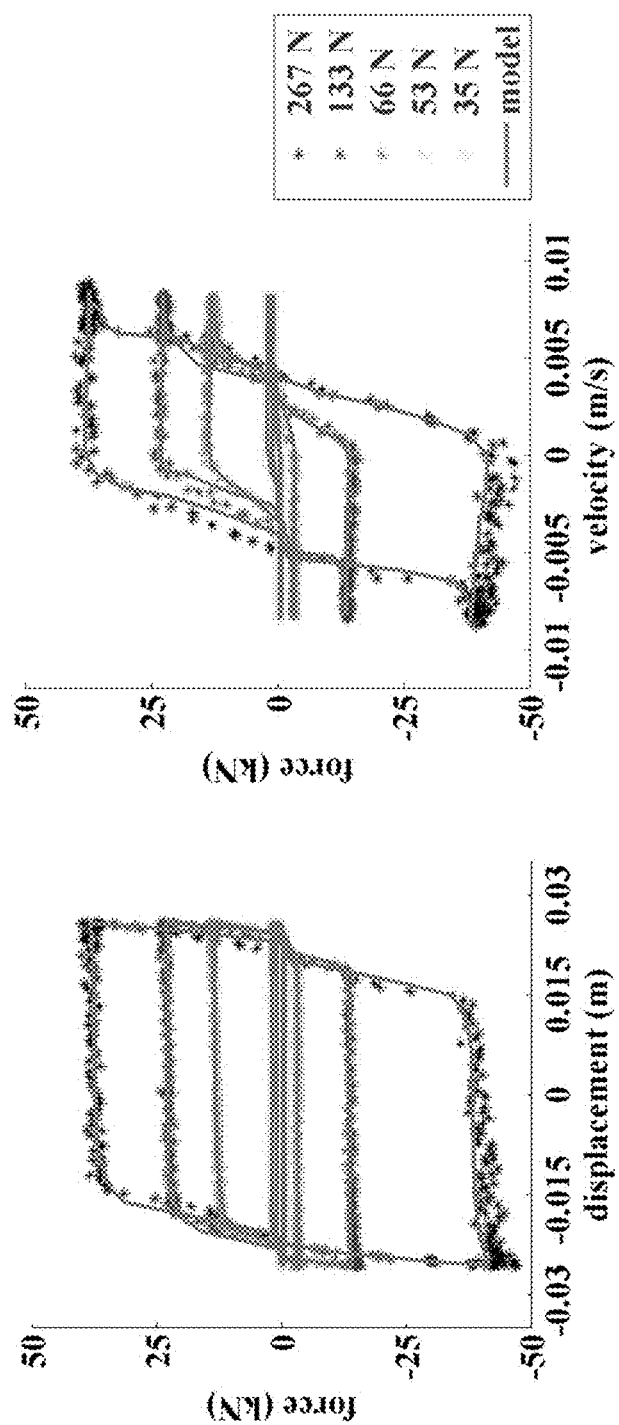

FIGS. 8A and B are related graphs illustrating experimental data fitting under various levels of force inputs for a 0.05 Hz excitation. FIG. 8A is a force-displacement plot. FIG. 8B is a force-velocity plot.

FIGS. 9A and B are related graphs illustrating experimental data fitting under various levels of force inputs for a 0.50 Hz excitation. FIG. 9A is a force-displacement plot. FIG. 9B is a force-velocity plot.

FIGS. 10A and B are related graphs illustrating experimental data fitting under various excitation frequencies for a 133 N (30 lbs.) force input. FIG. 10A is a force-displacement plot. FIG. 10B is a force-velocity plot.

FIGS. 11A and B are modeled dynamics of the BRFD of FIG. 1 under various force inputs under a 0.05 Hz excitation of 25.4 mm (1 in) amplitude. FIG. 11A is a force-displacement plot. FIG. 11B is a force-velocity plot.

Figures 12A, 12B:
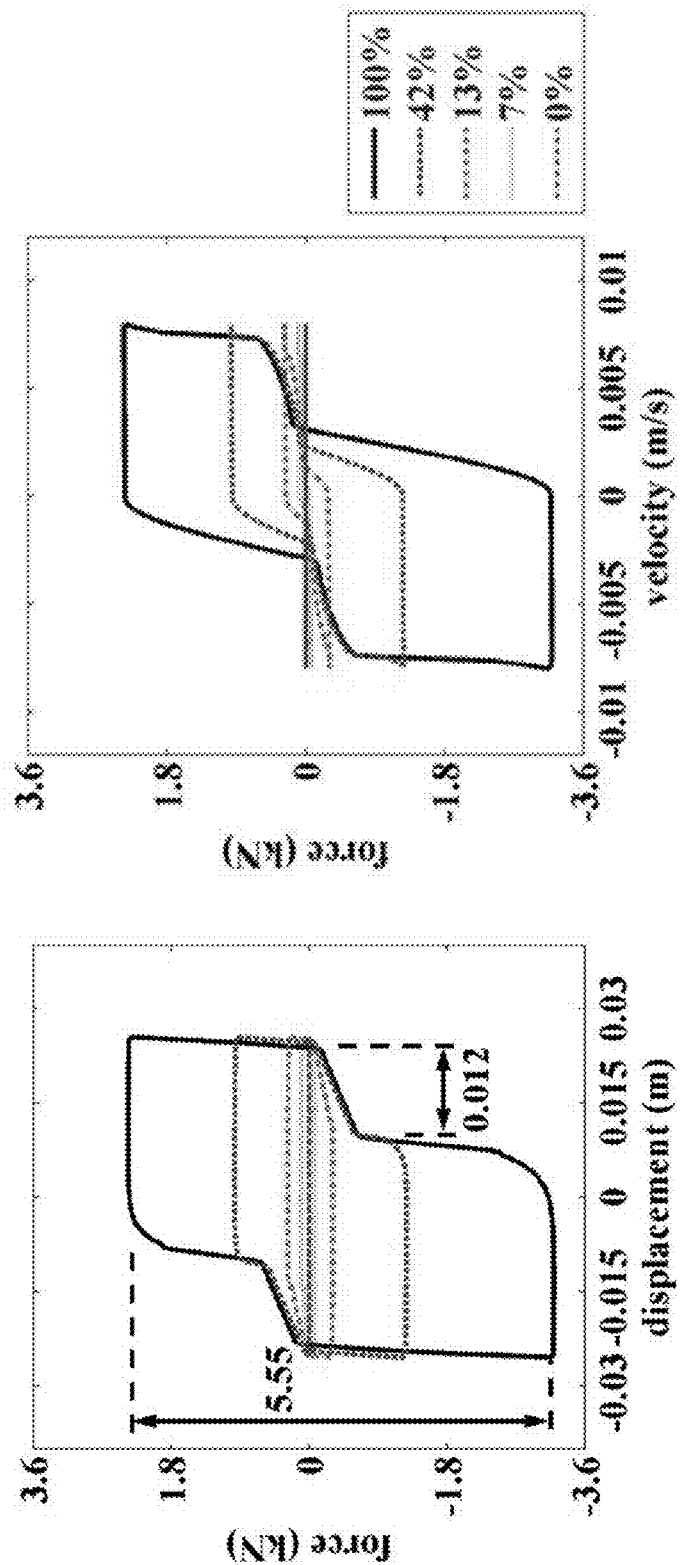

FIGS. 12A and B are, for comparison with FIGS. 11A and B, modeled dynamics of another frictional damper approach (e.g. "MFD") under various force inputs under a 0.05 Hz excitation of 25.4 mm (1 in). FIG. 11A is a force-displacement plot. FIG. 11B is a force-velocity plot.

Figure 13A:
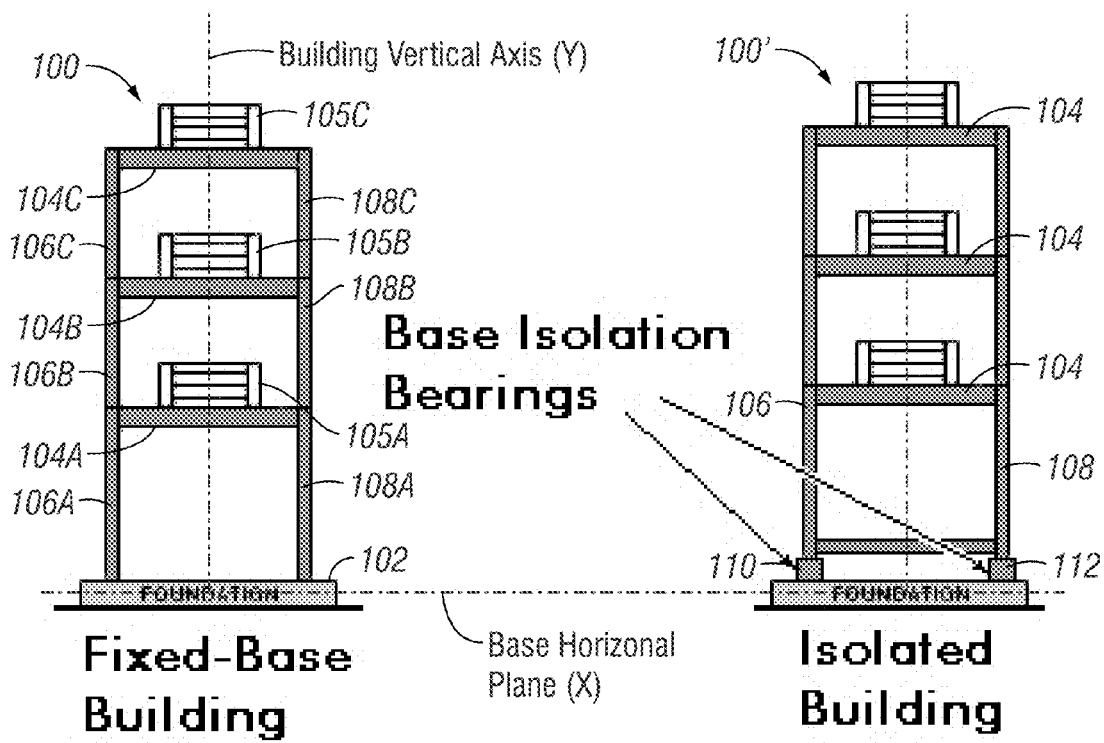

FIG. 13A is a highly diagrammatic illustration of a conventional building structure. The left side is a fixed base construction. The right side is an isolated building construction using isolation bearings between base and super structure.

Figure 13B:
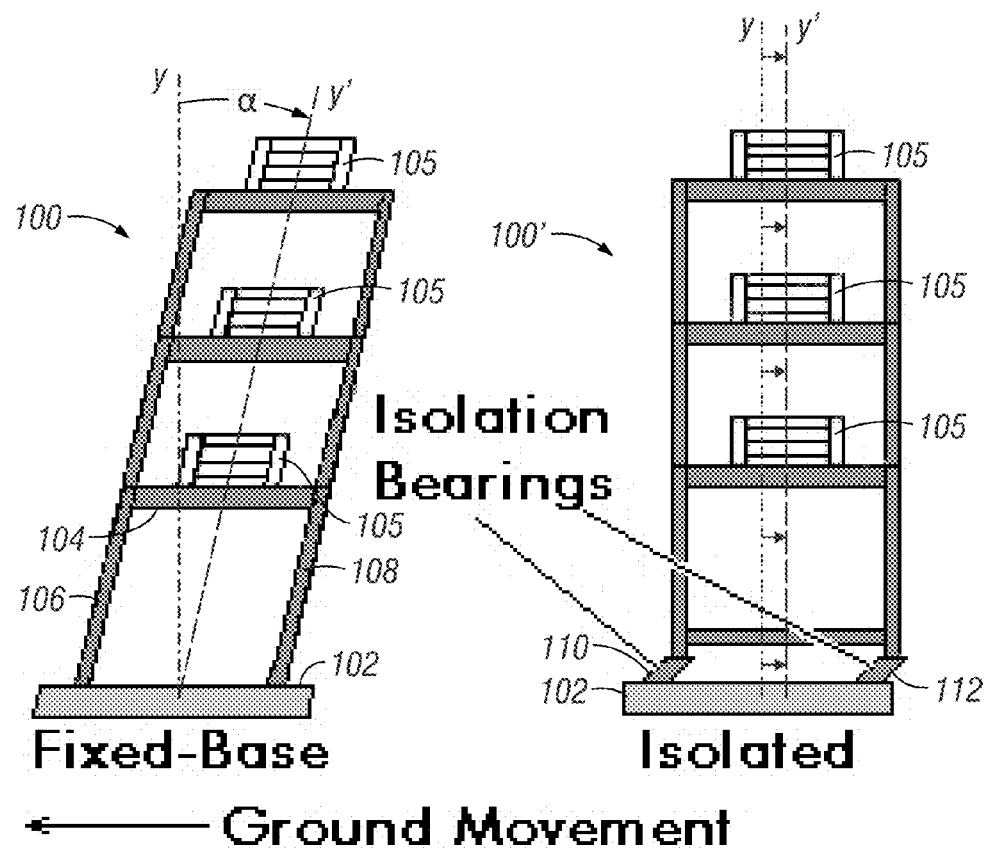

FIG. 13B is similar to FIG. 13A but shows in exaggerated fashion movement of either building style in response to ground movement.

Figure 2:
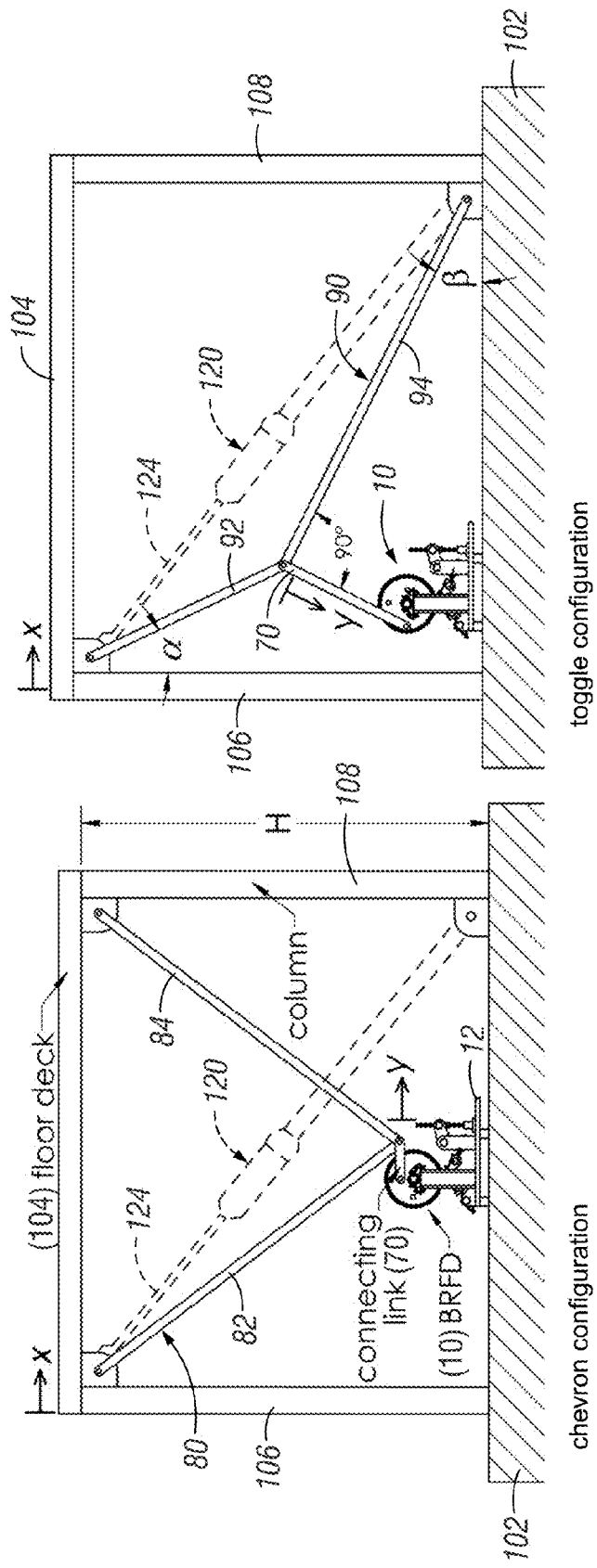
FIGS. 2A and 2B are side-by-side alternative configurations of the BRFD of FIG. 1 installed within a building or other structural system. An optional hydraulic damper connected to the building in parallel with the BRFD is shown in dashed lines.
Figure 13C:
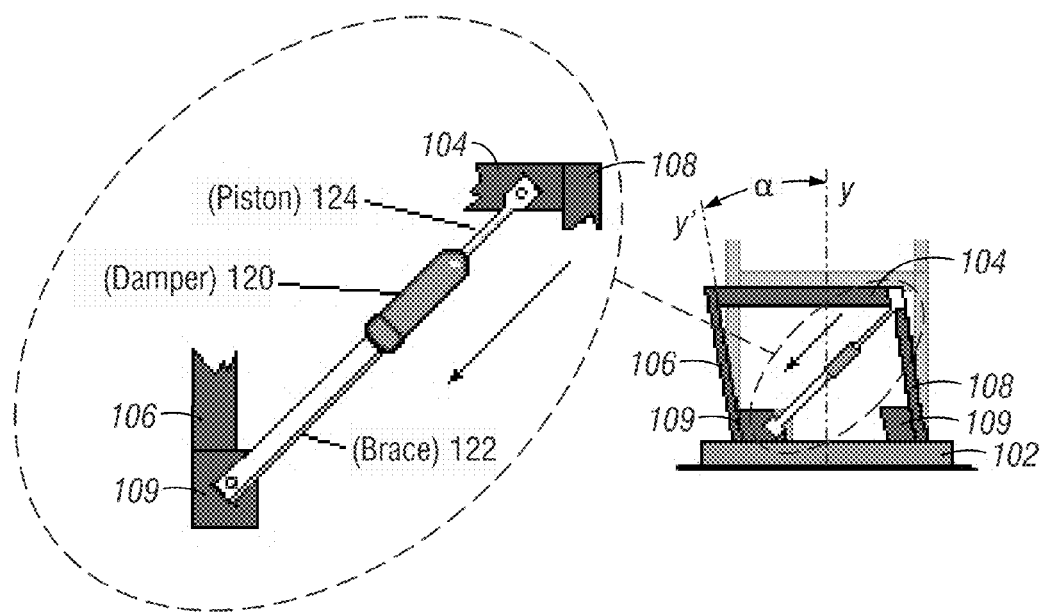

FIG. 13C is an illustration of a prior art passive hydraulic piston-based damper system which could be used in parallel with the BRFD of FIG. 1 (see also FIGS. 2A and B).

Figure 14A:
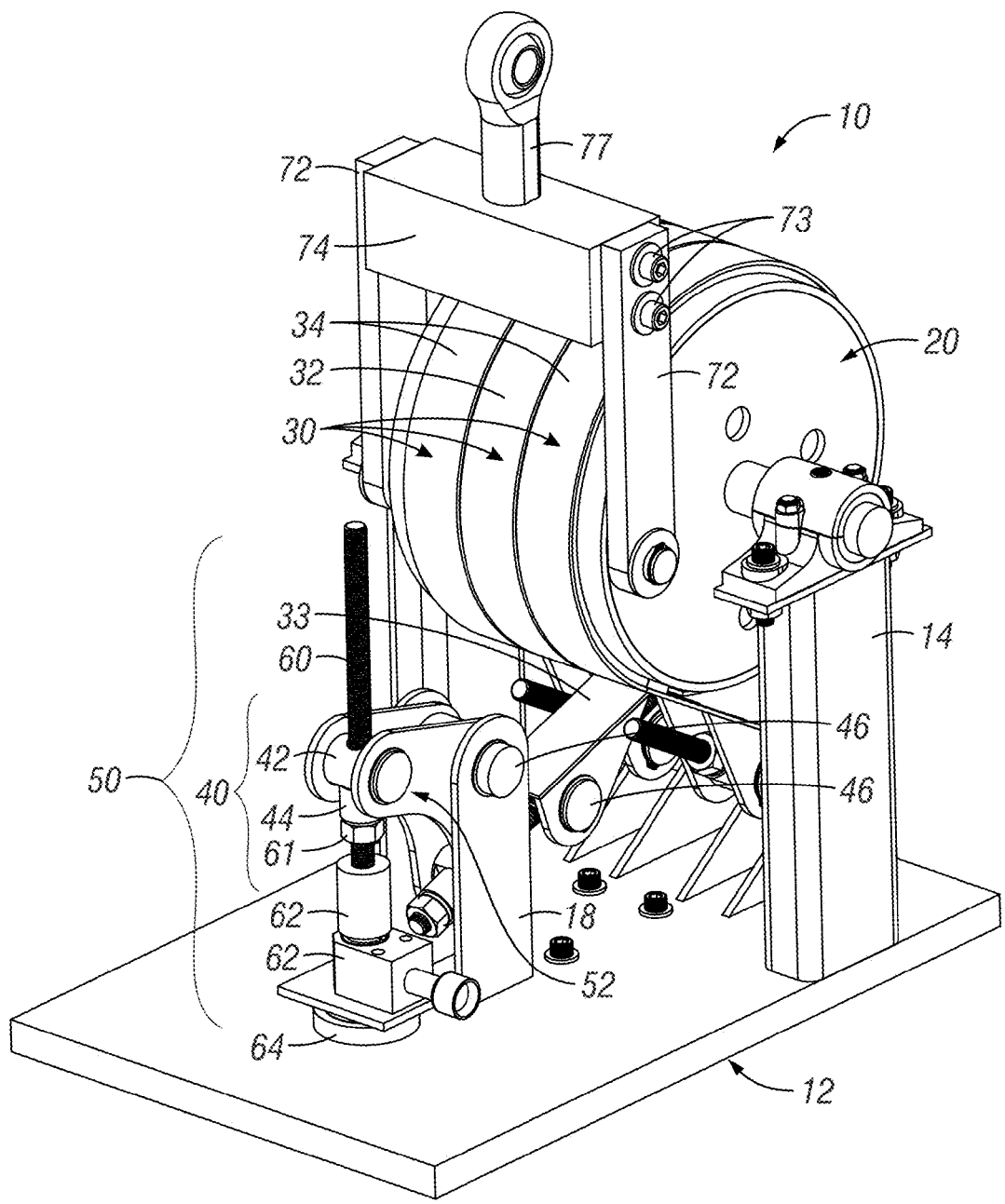

FIG. 14A is similar to FIG. 1 and shows an assembled view of a BRFD.

Figure 14B:
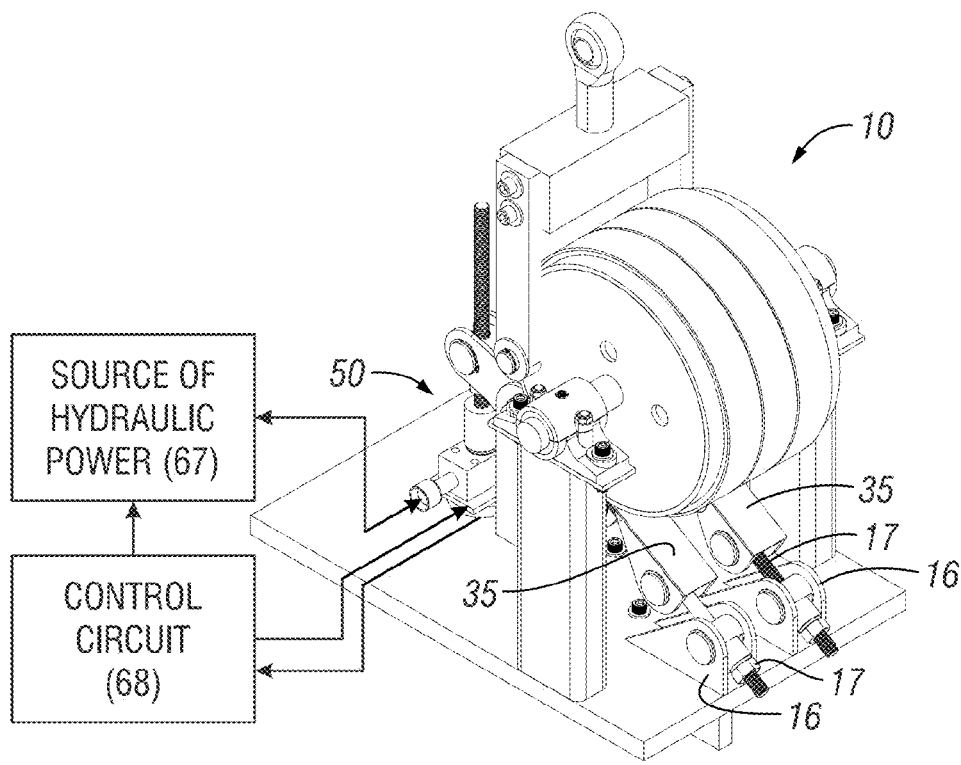

FIG. 14B is a perspective view of the BRFD of FIG. 14A from a different perspective than FIG. 14A.

Figure 14C:
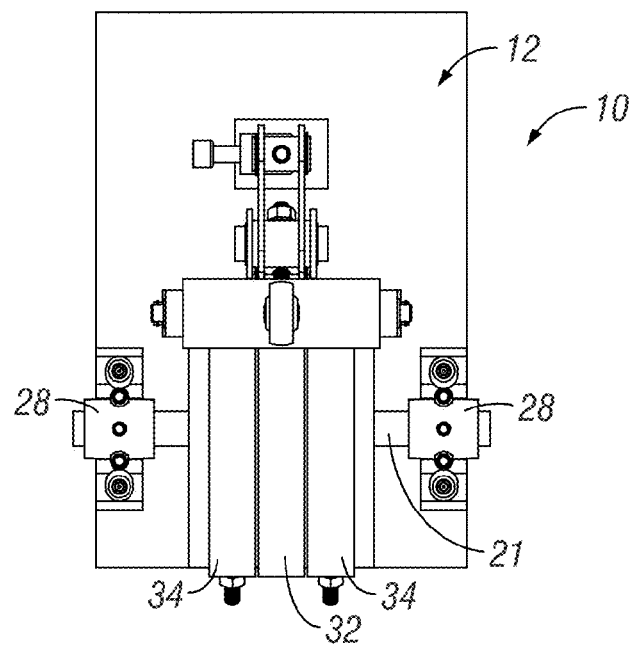

FIG. 14C is a top plan view of FIG. 14A.

Figure 14D:
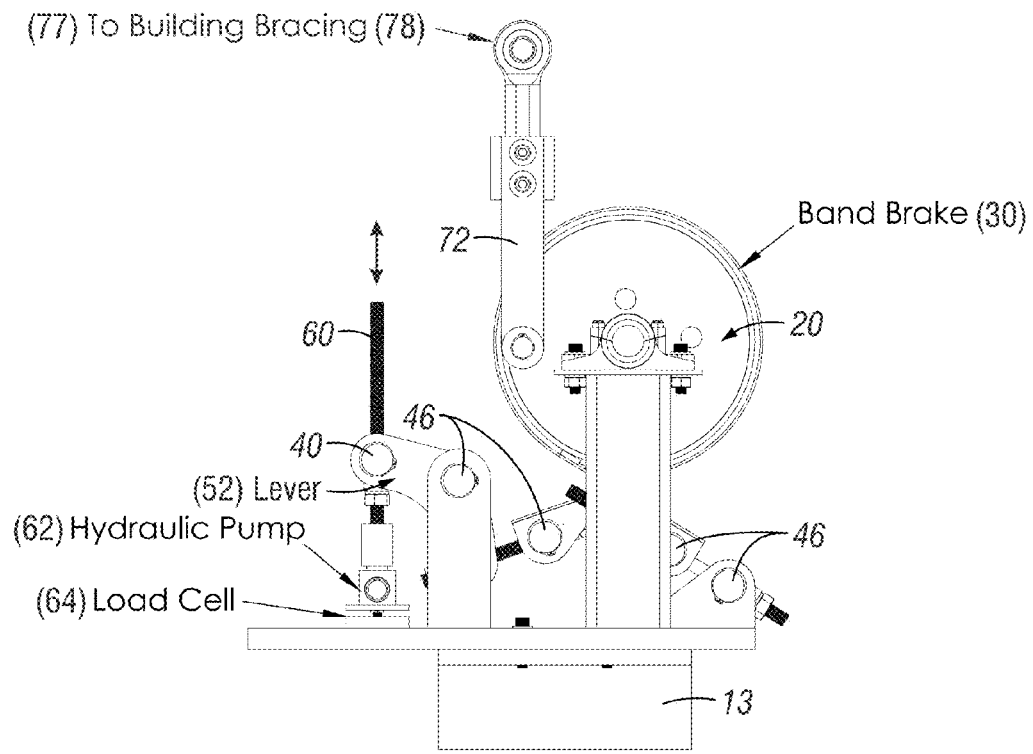

FIG. 14D is a side elevation view of FIG. 14A.

Figure 14E:
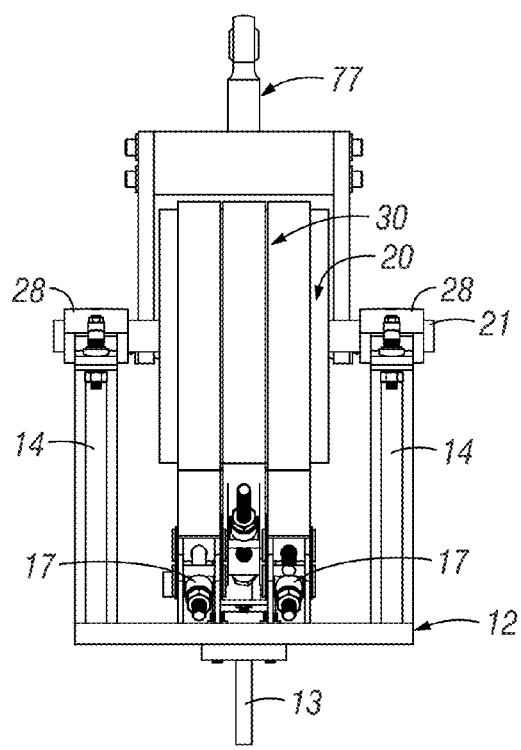

FIG. 14E is an end elevation view of FIG. 14A.

Figure 15A:
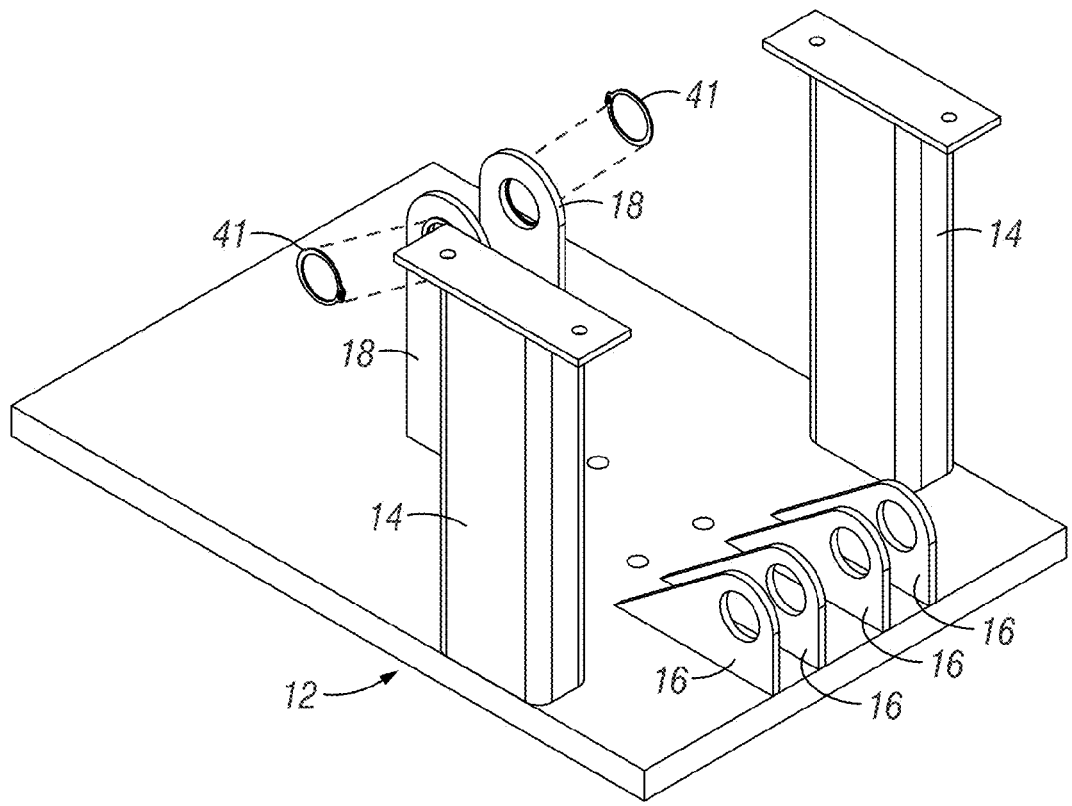

FIG. 15A is a partial assembled view of a frame of the embodiment of FIG. 14A.

Figure 15B:
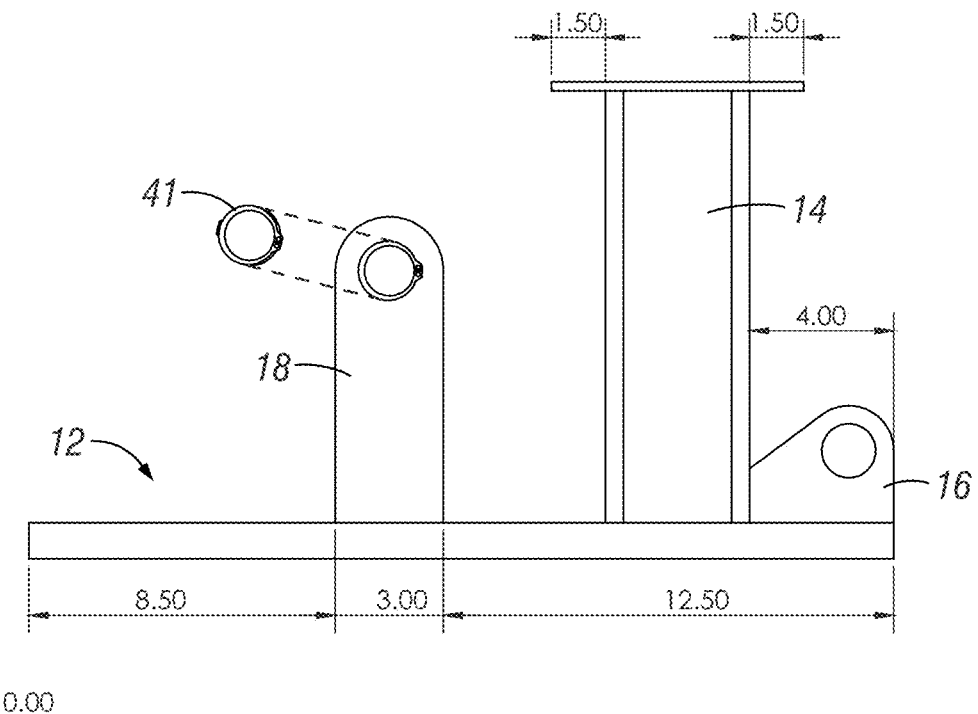

FIG. 15B is a side elevation of FIG. 15A.

Figure 15C:
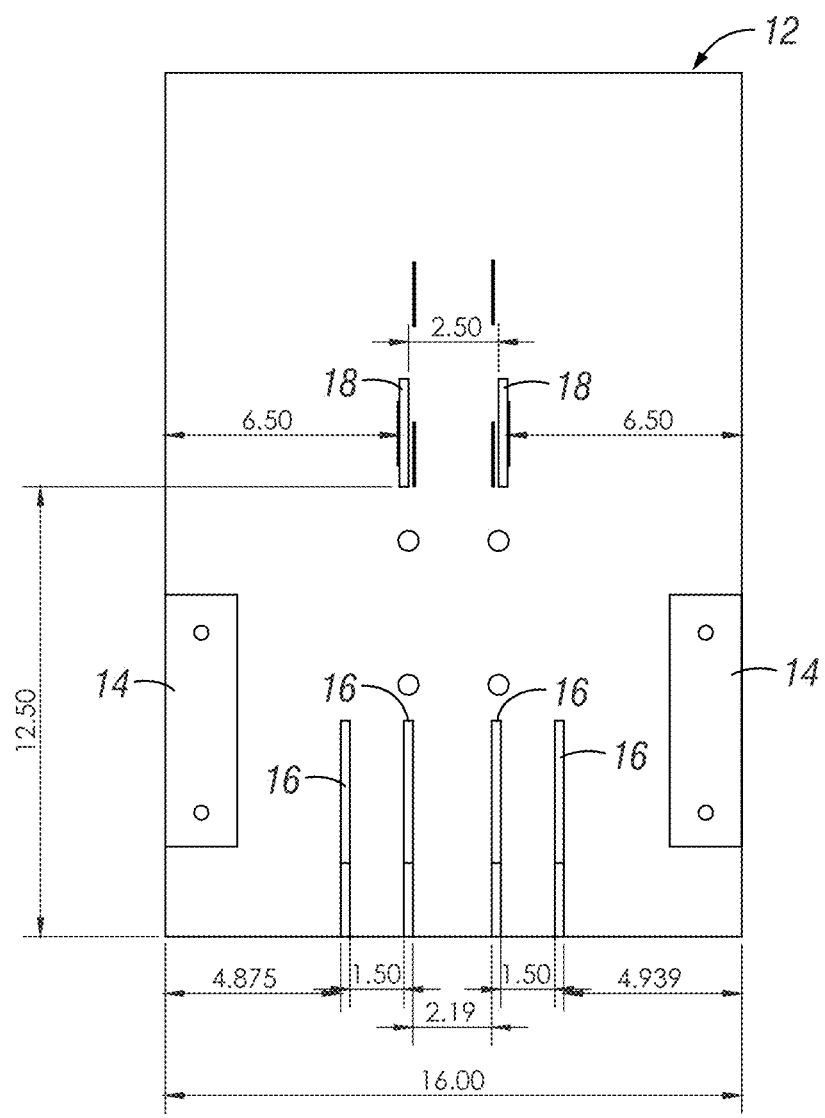

FIG. 15C is a top plan view of FIG. 15A.

Figure 16A:
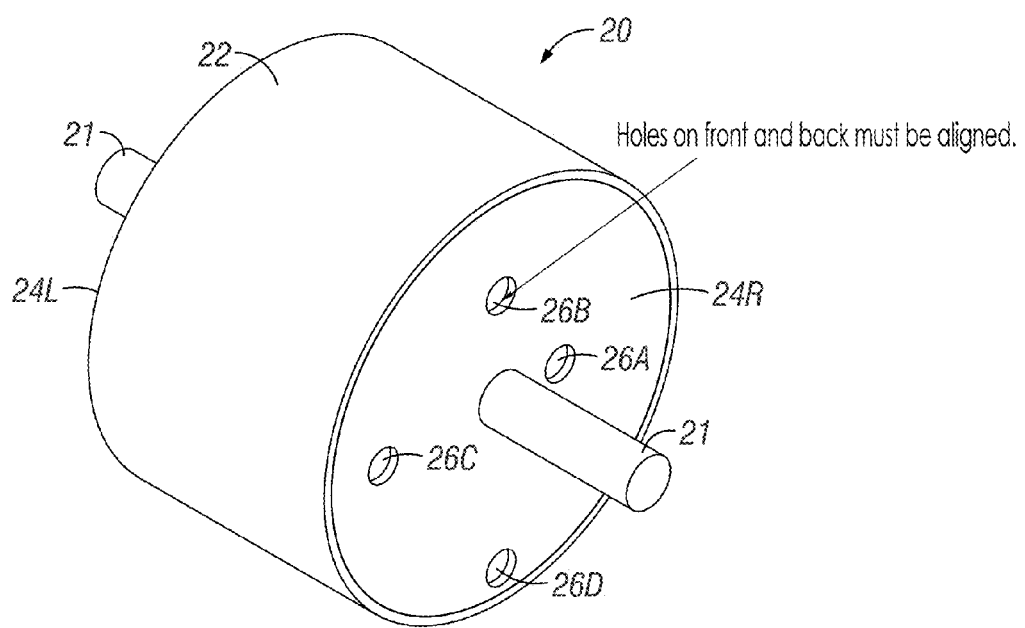

FIG. 16A is an assembled view of the rotating drum or cylinder of the embodiment of FIG. 14A isolated from the remainder of the apparatus.

Figure 16B:
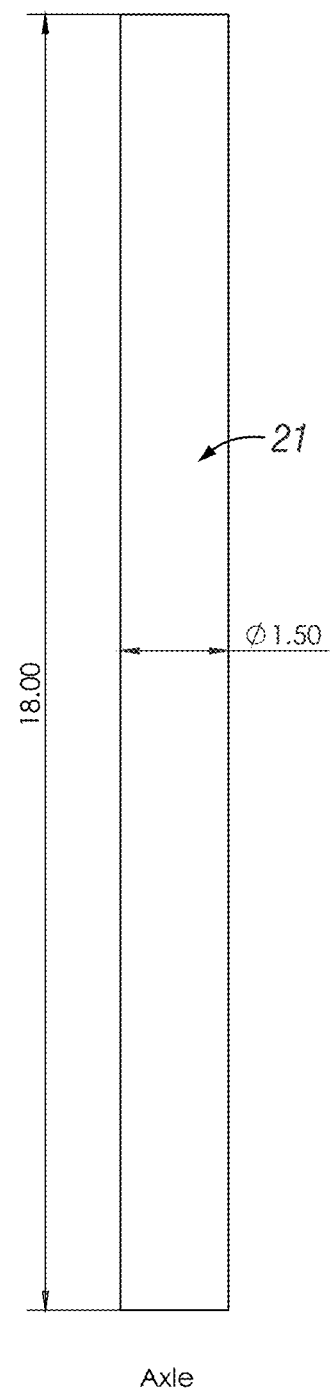

FIG. 16B is an isolated plan view of an axle used to make a drum assembly with the drum of FIG. 16A.

Figure 16C:
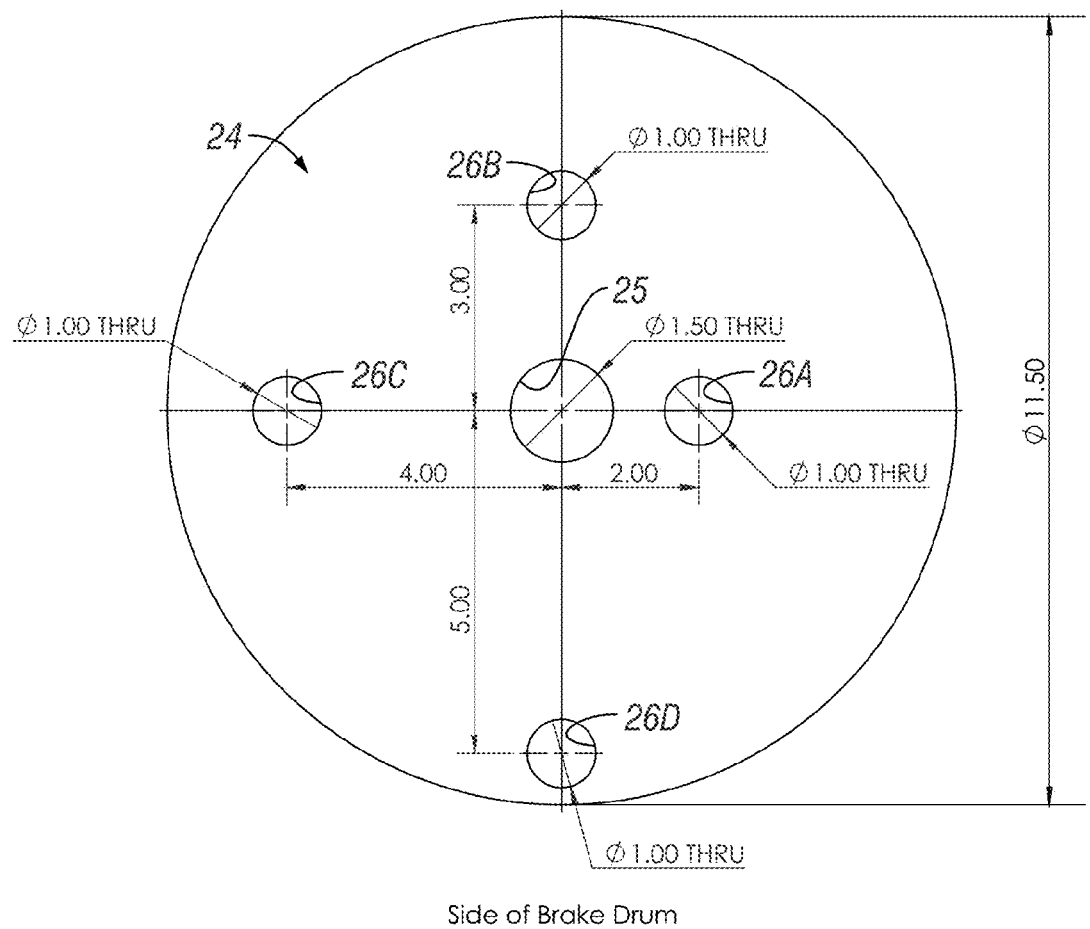

FIG. 16C is an enlarged side elevation of the face plates of the cylinder of FIG. 16A.

Figure 17B:
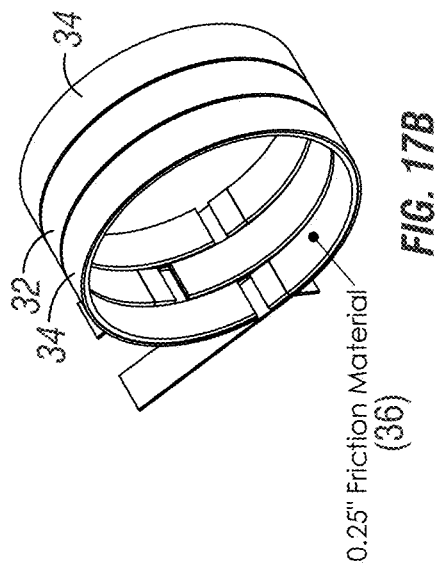
Figure 17A:
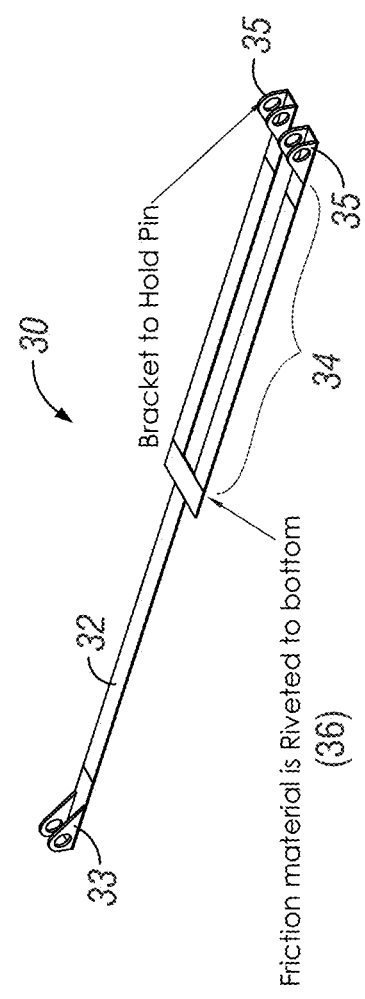

FIG. 17A is a reduced in scale perspective view of the band that is wrapped on the drum of the embodiment of FIG. 14A.

FIG. 17B is a slightly enlarged view of the wrapped portion of the band of FIG. 17A as it would appear around a drum.

Figure 17C:
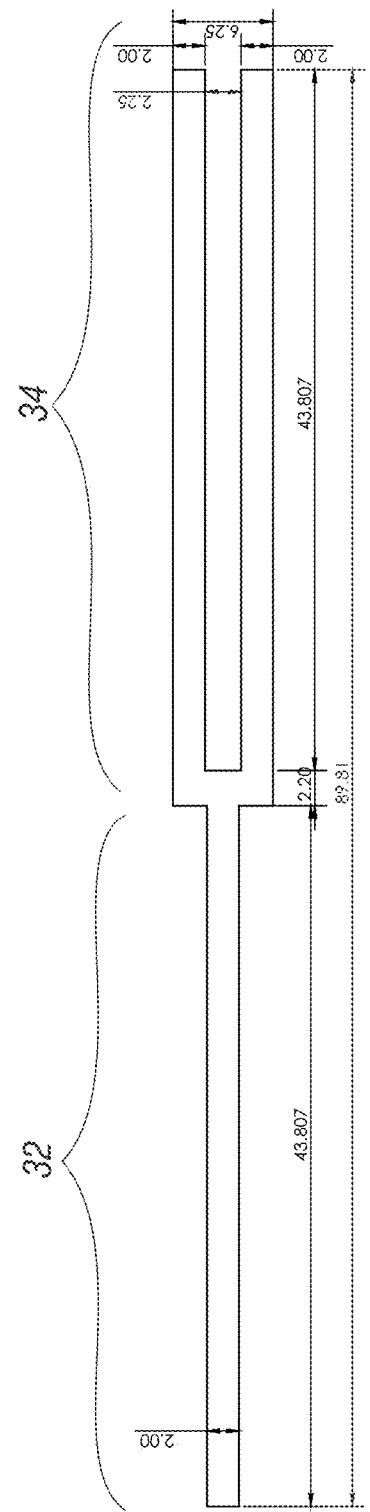

FIG. 17C is a plan view of the band portion of FIG. 17A laid out on a flat surface.

Figure 18A:
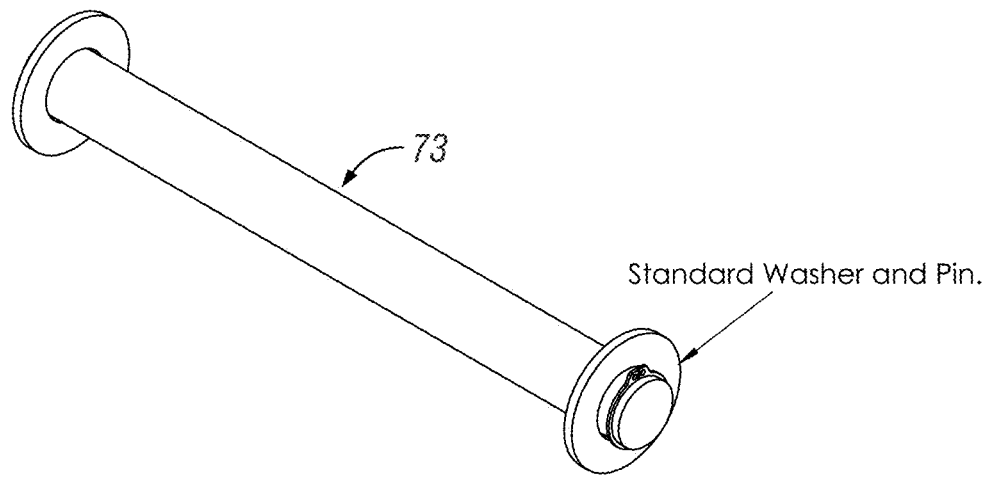

FIG. 18A is a perspective view of a pin that can be used in two locations in the linking assembly between the drum and building bracing.

Figure 18B:
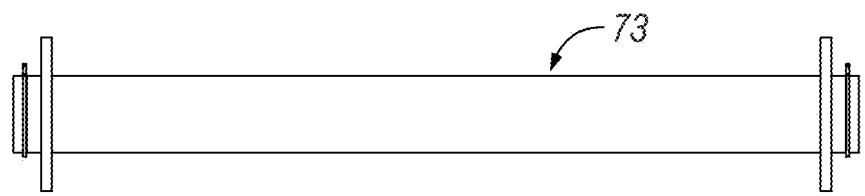

FIG. 18B is a plan view of FIG. 18A.

Figure 19:
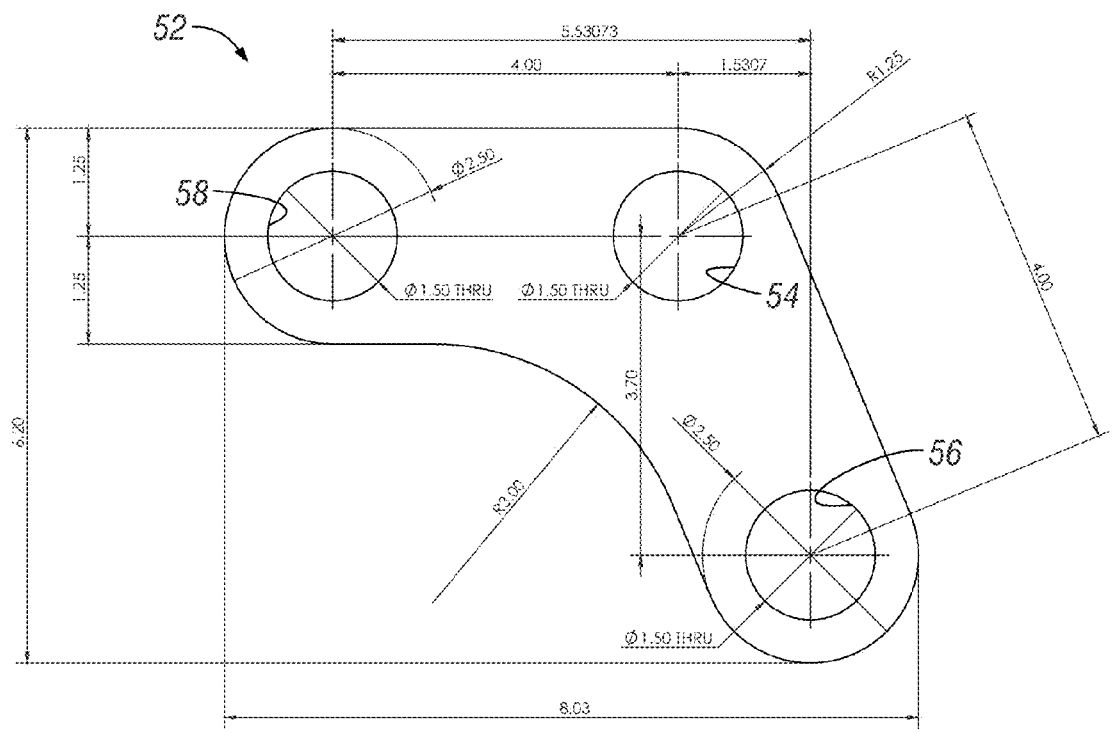

FIG. 19 is an enlarged side elevation of a lever arm used for variable tension of the band of FIG. 14A.

Figure 20A:
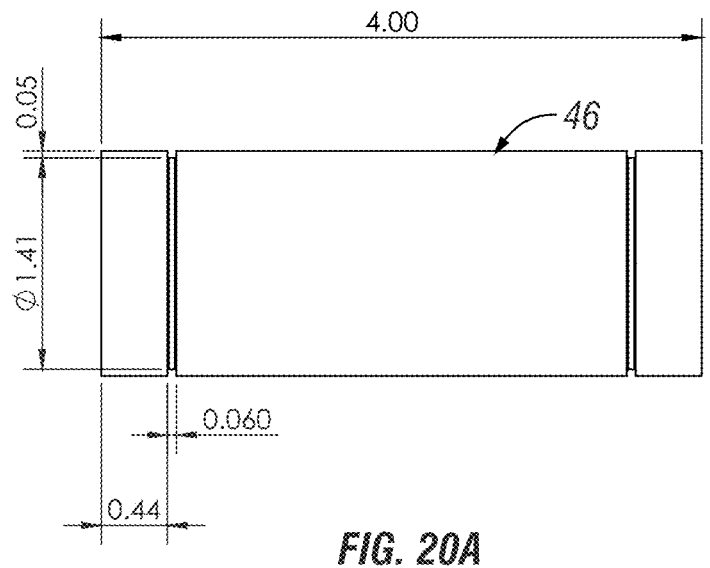
Figure 20B:
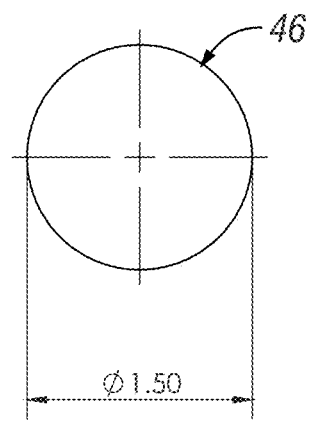

FIGS. 20A and B are enlarged perspective and plan views, respectively, of a connecting pin that can be used to connect the band to the frame of the BRFD.

Figure 21:
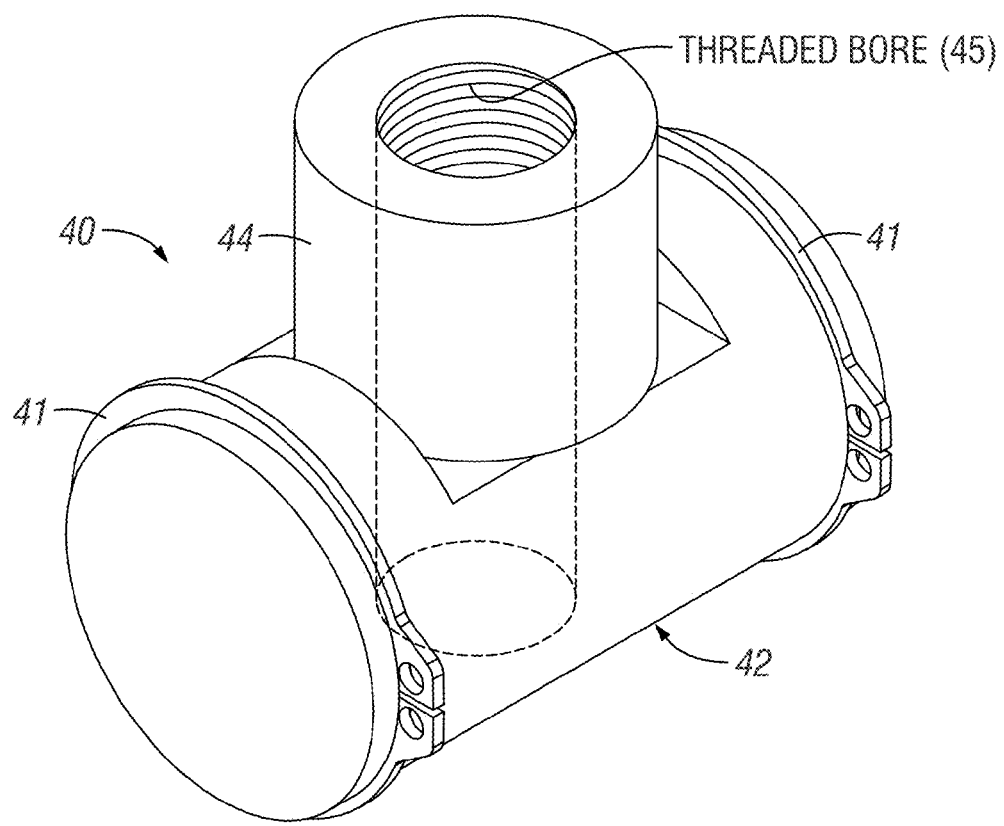
Figure 22A:
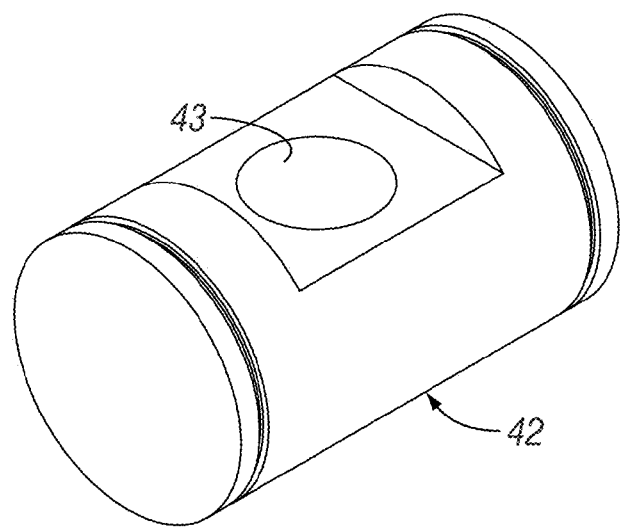
Figure 22B:
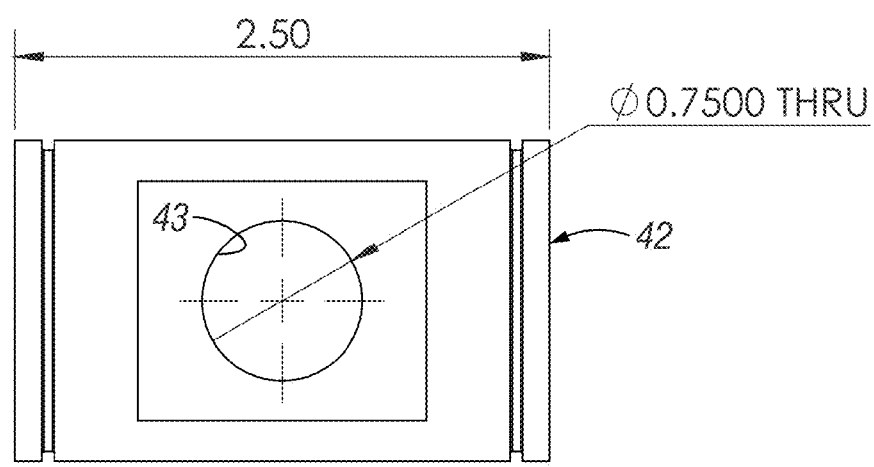
Figure 22C:
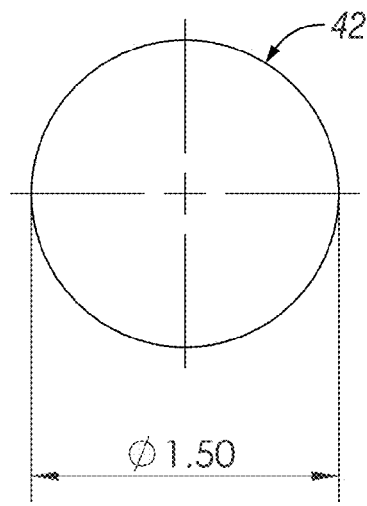
Figure 22D:
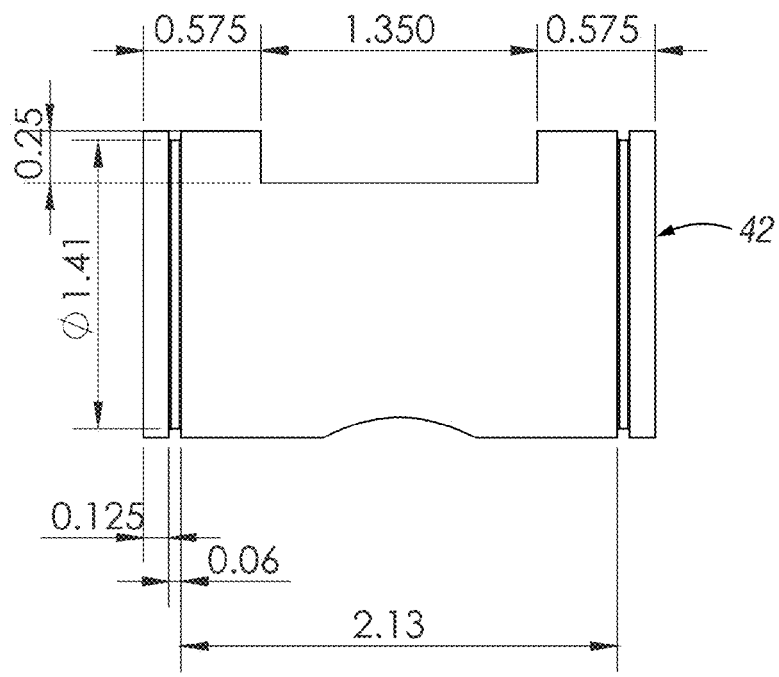

FIG. 21 is a greatly enlarged inverted perspective view of a pin and nut combination used with a screw rod connection for the variable tension actuator for FIG. 14A.

FIGS. 22A-D are enlarged perspective, top plan, end elevation, and side plan view, respectively, of the pin portion (with nut portion removed) of FIG. 21.

Figure 23:
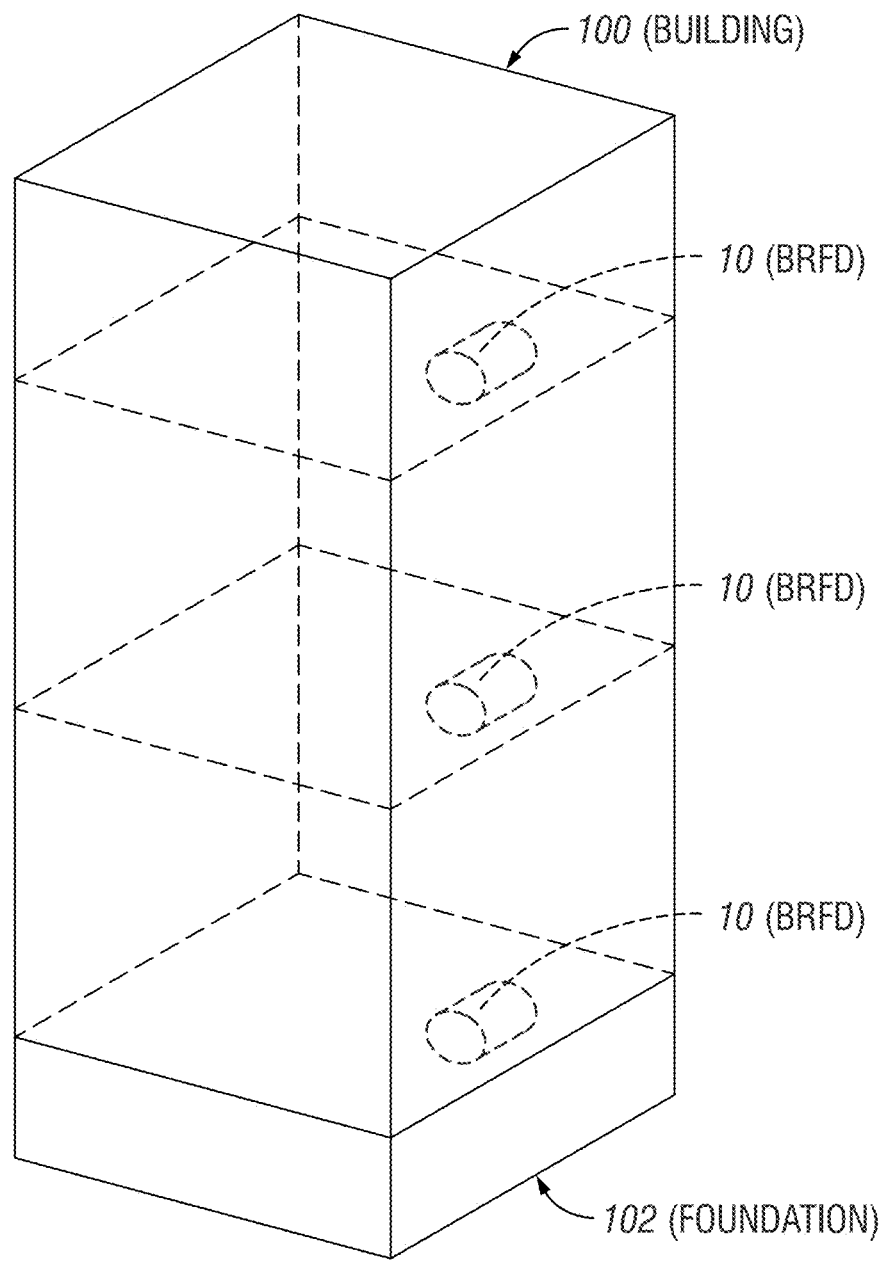

FIG. 23 is a diagrammatic illustration of alternative or multiple placements of BRFDs in a building.

Figure 24:
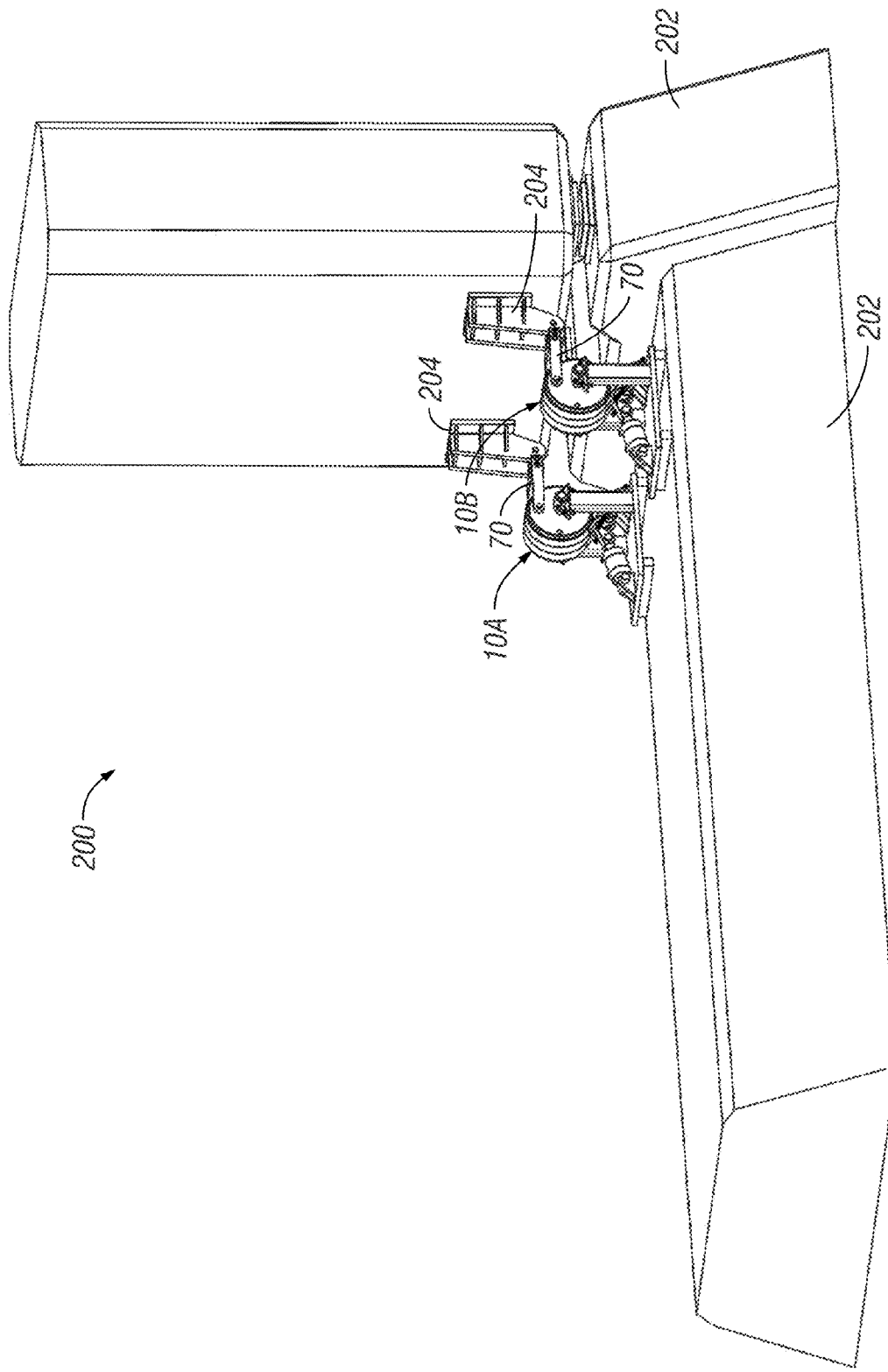

FIG. 24 is a depiction of plural BRFD apparatus applied to a bridge.

FIGS. 25A and B are illustrations of a BRFD apparatus applied to a tall pole, in this case elevating a wind turbine, FIG. 25A showing the combination with a portion of the pole removed to see the BRFD, and FIG. 25B comprising an isolated enlargement of the BRFD of FIG. 25A.

Figure 26A:
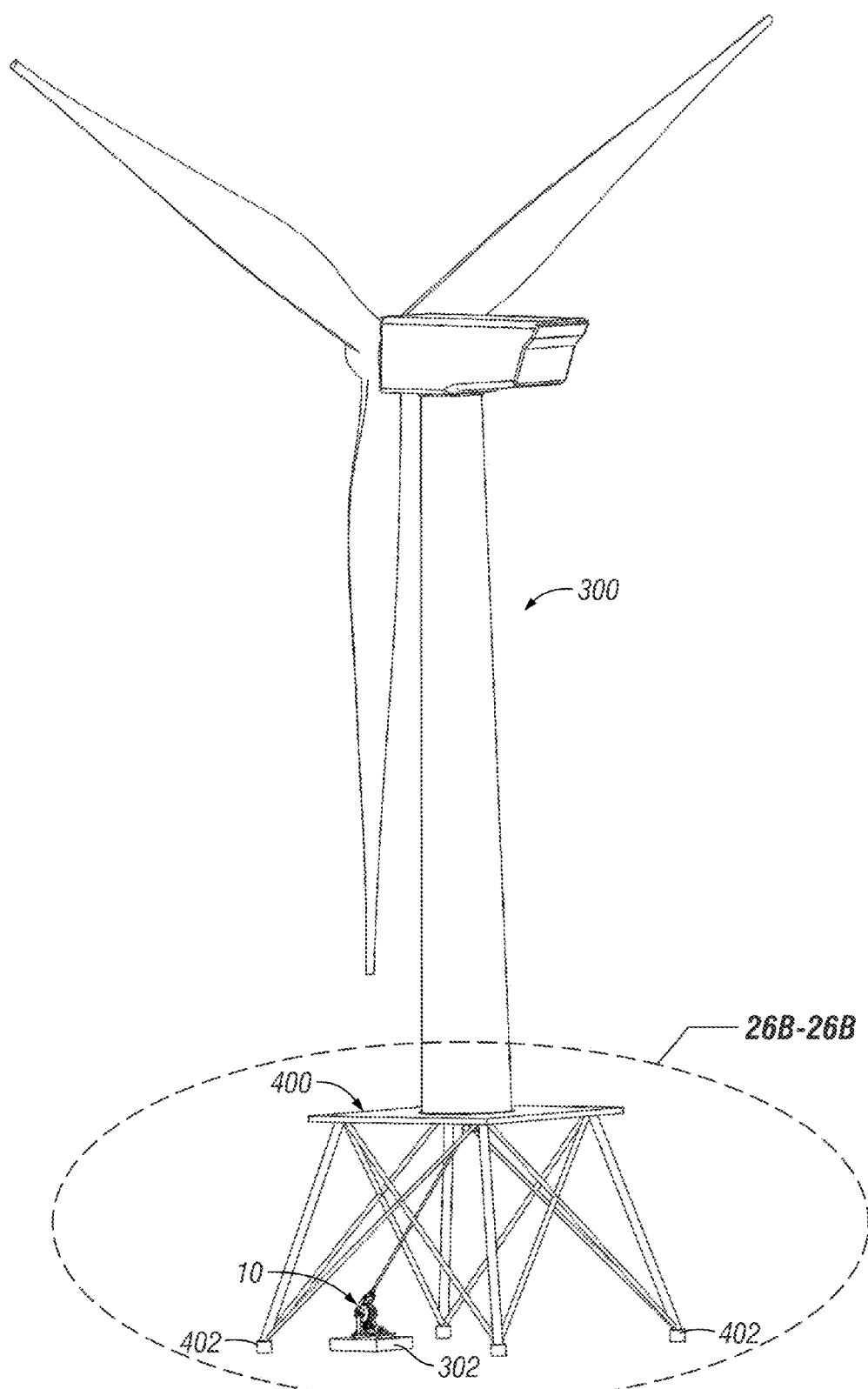
Figure 26B:
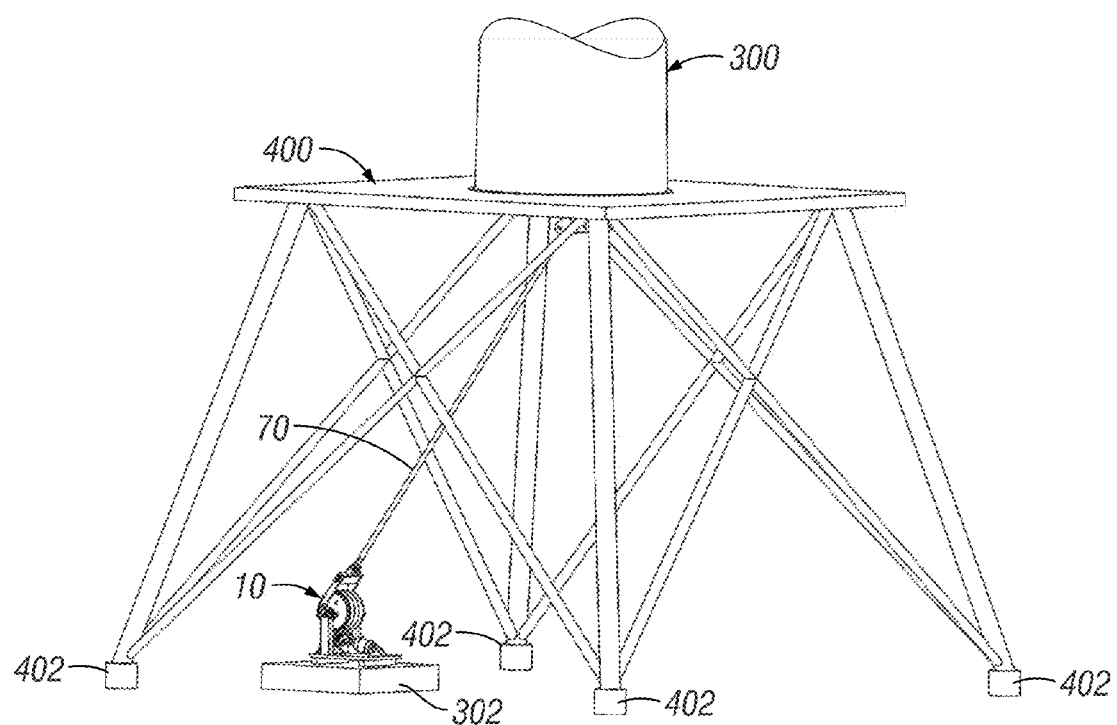

FIGS. 26A and B are highly diagrammatic depictions of a BRFD apparatus applied to an offshore structure whether anchored in the seabed or floating. FIG. 26B is an isolated enlargement of the structure and BFRD of FIG. 26A.

Figure 27:
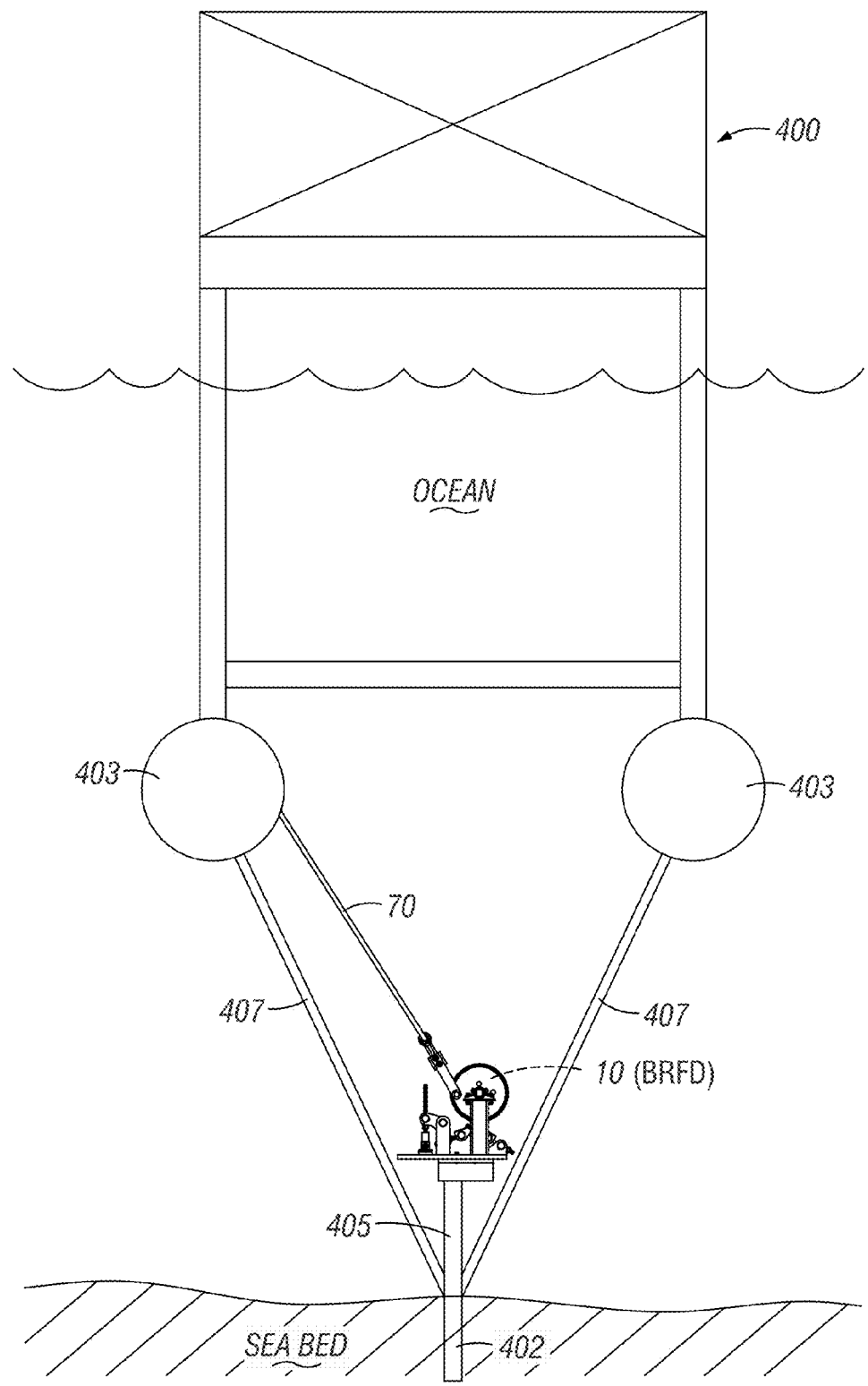

FIG. 27 is a highly diagrammatic depiction of a BFRD in a floating structure which is tethered or anchored to the earth.

Figure 28:
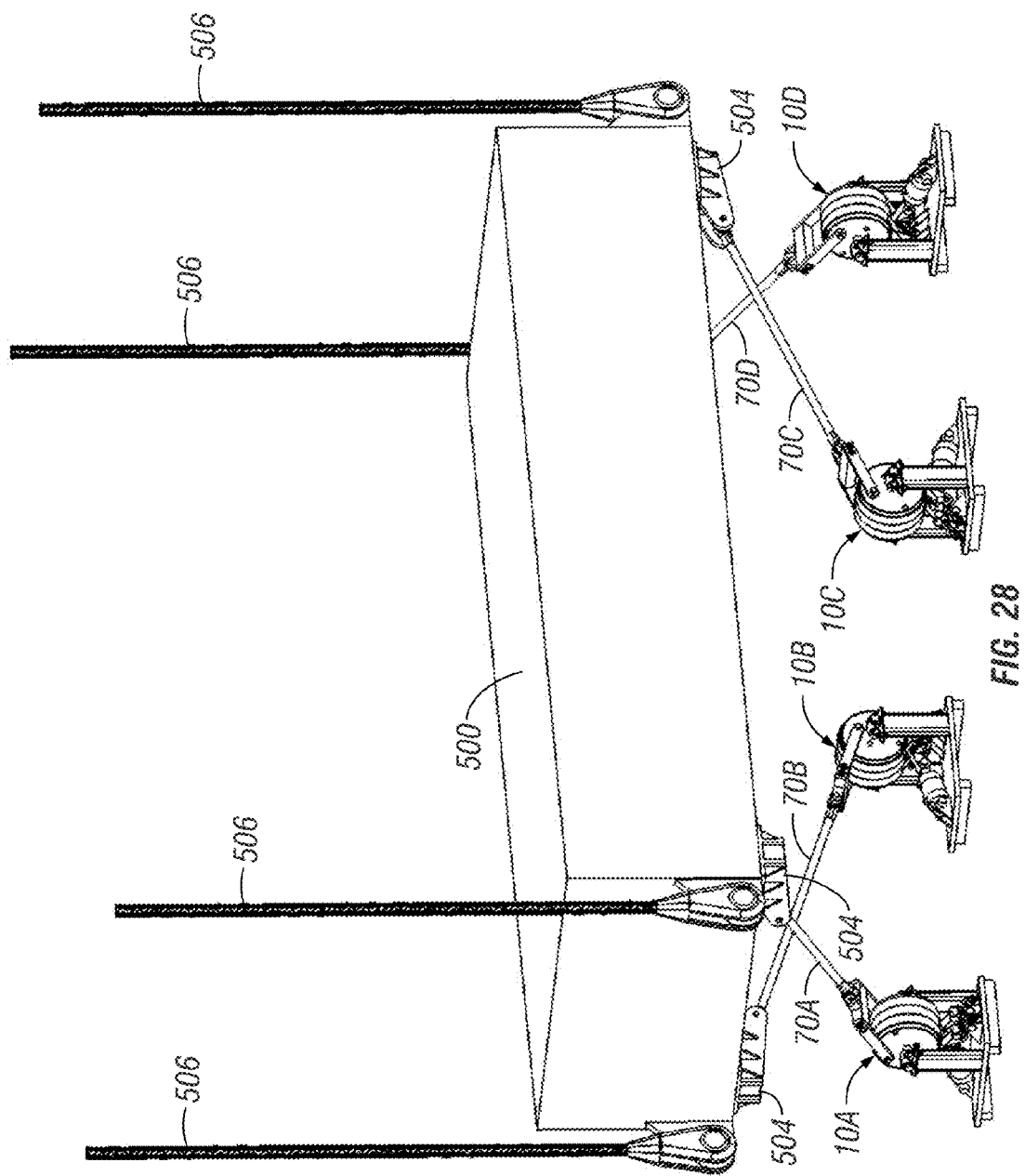

FIG. 28 shows application of plural BRFDs to a tuned mass isolation system.

Figure 29:
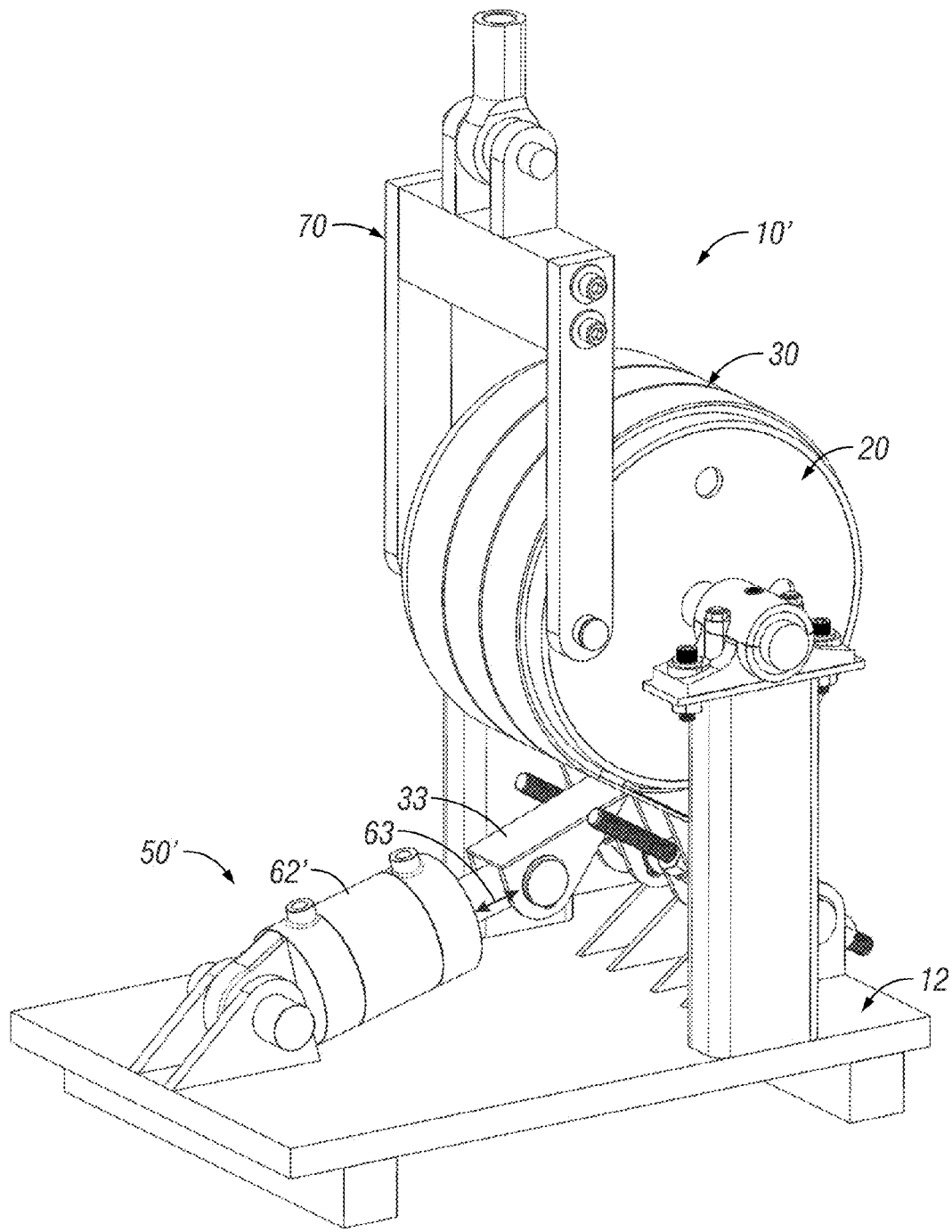

FIG. 29 is similar to FIG. 14A but shows a BRFD with an alternative actuation subassembly.

IV. DETAILED DESCRIPTION OF THE EXEMPLARY EMBODIMENTS

A. Overview

For a better understanding of the invention, one or more forms the invention can take will now be described in detail. It is to be understood that these examples or embodiments are by way of example only and are neither inclusive nor exclusive of all the forms the invention can take.

These embodiments will be described primarily in the context of a damping device installed at the base (e.g. foundation) of a vertical structure comprising a building to provide damping for movement (including oscillation) of the vertical structure. It is to be understood, however, that the invention can be utilized in analogous ways for other applications. Other applications can include, but are not limited to, base-isolation systems, inertia systems, isolation of bridges, isolation of wind turbine systems, and isolation of off-shore structures. Those skilled in the art will appreciate how to implement the embodiments into such and other structures.

These embodiments will also refer to damping of movement of a structure. This includes a variety of types of movement, including but not necessarily limited to directional movement, vibration, and oscillation.

To assist in the description, reference will be taken to the highly diagrammatic illustrations of FIGS. 13A and 13B, which show two conventional building construction techniques (FIG. 13A—one a fixed base building 100; the other building 100' is isolated from its base or foundation 102 by base isolation bearings 110 and 112). Vertical structural components 106 and 108 (e.g. beams, walls, etc.) support one or more floor decks 104 on base or foundation 102. Each floor deck 104 usually supports some additional load (see schematic box 105 on each deck 104).

As is well-known by those skilled in this technical art, damping is intended to address movement of building 100 or 100' relative to fixed base 102 along axis X. As greatly exaggerated in FIGS. 13A and B, movement in this example can include the difference between normal building vertical axis Y and an offset to axis Y' such as can be caused by wind or seismic event. A fixed base configuration (left side of FIG. 13B) would typically primarily result in an angular offset a (tilt between normal vertical axis Y and Y') with, for example, ground movement in the direction shown in the event of an earthquake. That ground movement may be predominately in one direction, but typically would be back and forth in opposite directions along the arrow, which would tend to cause roughly symmetrical tilting vibration or oscillation of building 100 an amount of + and −α on both sides of axis Y. It is typical that such ground shaking would be primarily along one vertical plane. As further appreciated by those skilled in the art, wind events can cause building tilt in away from the main wind direction. It could also cause an offset between Y and Y'. Also, it could cause some oscillation of + and −α as the building will try to restore to normal position and such forces can set up harmonic-type oscillation.

FIG. 13B (right side) illustrates another type of building movement. Isolation bearings 110 and 112 passively try to damp strain on building 100' caused by ground movement. While bearings 110 and 112 may tilt on foundation 102 away from that ground movement, and keep the vertical supports 106 and 108 more vertical (as opposed to the tilting of the fixed base configuration of FIG. 13A), it still can result in building movement. As diagrammatically illustrated, a more horizontal shift or offset would occur between normal building vertical axis Y and shifted axis Y'. The walls 106/108 would basically be laterally translated and strain would be substantially on the isolation bearings 110/112. The same or similar can occur in wind events. It is possible there could be lateral building shifting and some tilting.

Thus, in either case, there can be movement of the building. There might be no further protection against such movement. However, as discussed earlier, a number of systems, over and above isolation bearings, can be installed to try to damp such movement.

FIG. 13C illustrates one well-known damping connection to building 100. A hydraulic piston-based damper 120, it is essentially a bracing from one corner or wall/floor deck connection area 104 to or towards an opposite corner 109 at or near the base. Hydraulic damper 120 is passive damper in the sense it reacts without any energy input. It has a fixed-length rigid brace portion 122 and a piston portion 124. Piston portion 124 can slide over some range in either direction along the brace portion 122 longitudinal axis. Fluid in the piston portion 124 would resist such movement. This would lend some level of damping against movement of either a fixed base or isolation bearing building base of buildings 100 or 100', and one or more floor decks 104A, B, C, etc., elevated above such a base or foundation 102 on opposite vertical structural members or walls 106A, B, C, etc. and 108A, B, C, etc.

It is to be further understood that these examples will be described in the context of a specific damping apparatus. As will be discussed in more detail below, the specific exemplary embodiment has been tested and is indicated to be capable of supplying a certain damping force. Specific dimensions, material characteristics, and component cooperation will be discussed. The designer has some ability to adjust that force with the specific scale and materials indicated for that embodiment. However, it is to be understood that the invention can be implemented in different sizes and scales, with variations in materials and components, as will be appreciated by those skilled in the art. The specific dimensional size and other characteristics of the exemplary embodiment can be changed according to need or desire. Those design variations can be selected to produce more or less damping forces.

Additionally, the embodiments will be described in the context of replacing or being installed in parallel with or otherwise for concurrent use with other and different dampers. One example is the piston-based damper of FIG. 13C. It is to be understood the plural dampers according to the exemplary embodiment can be installed in the same building. They could be placed at or near each other or spaced apart. They could be configured to damp against forces in the same direction. They could configured to damp against forces from different directions.

B. Apparatus Example

FIGS. 1-22A-D illustrate various aspects of an apparatus 10 and its major components according to an exemplary embodiment of the present invention. This embodiment will sometimes be referred to as a banded rotary friction device (BRFD).

With reference to FIG. 1, some type of frame 12 will include a rotating drum 20, a frictional band 30 around drum 20, with opposite ends of band 30 fixed to frame 12 and an actuation mechanism 50 respectively. A linkage 70 will be operatively connected to a building bracing 78. In this manner, horizontal movement of a floor deck would be translated into rotary motion of the brake drum 20 through linkage 70. Band 30 would resist such rotation. Damping forces are thus presented for the building.

1. Frame

Frame 12 is adapted to be fixed to a building base or foundation. It is made of strong and durable materials (e.g. plate steel of the type A-36). It can be connected to the building in robust ways (e.g. bolts) that can withstand the forces it is designed to experience. Appropriate materials and connection techniques are well known to those skilled in the art, and they can vary according to desire to need, including the specific form factor of frame 12.

Frame 12 has, for example, screws or bolts which allow attachment to such things as feet or legs 13A and B (see FIG. 4) which can be attached by any of a variety of attachment techniques to building base 102. Examples of such attachments could be screws, bolts, welding, or a combination, to name a few. The connection of frame 12 to building base 102 via legs 13 should be designed to be sufficient to withstand the forces that would tend to move drum 30 away from its fixed rotational position.

As can be seen in FIGS. 15A-C, frame 12 includes a pair of robust vertical pillars 14. These would support bearings for the rotational axle of drum 20. Frame 12 also contains four flanges or plates 16, each with aligned apertures. Pairs of plates 16 will connect, in a fixed manner, the double ends of the double ended section 34 of band 30 (see FIGS. 17A-C).

Frame 12 also includes another pair of plates 18 with aligned apertures at their distal ends. They are adapted for mounting of a lever assembly 52 (see one plate of that assembly in FIG. 19A) that allows variable tension on the single end 32 of band 30 (see FIGS. 17A-C).

FIGS. 15A-C show details, including some dimensions, of frame 12 and some of its sub-components, for this particular embodiment of BRFD 10. As can be seen in FIGS. 15A-C in this embodiment, certain dimensions illustrate one form the invention can take. Again, these dimensions pertain to one example for one application. They can be changed or scaled up or down according to need or desire.

As can be appreciated, frame 12 can take on many different scale, forms and configurations. It can be similar to what is shown in the Figures, e.g. a rigid and robust metal plate. But it can be multiple pieces or part of another member or existing structure(s). It can be of other materials or combinations of materials. The term frame is used to distinguish it from the term base, which is used primarily to describe the foundation or analog for the structure that is being damped.

2. Drum

Frame 12 supports a rotatable drum 20 on an axle 21 journaled in pillow block bearings 28 (e.g. order #635K22 from McMaster-Carr of Atlanta, Ga. (USA)) on drum mounts 14. (See FIGS. 1 and 14E). Linkage assembly 70 has link arms 72L and 72R eccentrically rotatably mounted along a common axis to opposite side faces 24L and 24R of drum 20. Flanges 76 on cross-arm 74 of assembly 70 connect (by pivot pin 75) damping apparatus 10 to building bracing 78. Cross-arm 74 can be attached to link arms 72 L and R by a pair of pins 73 (see FIGS. 14A and 18A-B). Alternatively, a pivot connection 77 could be rigidly mounted on cross-arm 74 (see FIG. 14A). The materials for these parts are also robust (e.g. steel of the type A-36) and would be selected to meet the forces apparatus 10 is designed to experience. Therefore, frame 12 is anchored to a building base or foundation and linkage assembly 70 is connected to bracing 78 of the building.

The drum can take different forms. For example, it could be more like a wheel. It can be scaled up or down. It could be rotatably supported in different ways.

However, this particular embodiment utilizes an approximately 12" diameter drum cylinder 22 (FIGS. 1 and 16A). Band 30 has an overall length of around 90 inches. Half 32 is an approximate 2" wide single section. The other half 34 is a pair of 2" wide parallel but spaced apart the ends. See FIG. 17C. FIGS. 16A-C illustrate features of drum 20. Axle 21 (see also FIG. 16B) is approximately 18" long by 1.50" diameter. Opposite face plates 24 are approximately 11.50" in diameter and have central apertures to receive axle 21; and also have four off-set smaller apertures 26A, B, C, and D, each at varying distance from the center bore 25 (see FIG. 16C). When faces 24 are installed on opposite ends of the drum cylinder 22, corresponding sets of openings 26A-D would each be aligned. This allows connection of link arms 72 at different points off-set from the drum rotational axis. This allows flexibility in use with different types of building bracing and linkage configurations. Examples of two are shown in FIGS. 2A and B.

As can be appreciated, the drum could be solid or partially-solid instead of tubular, could have different diameters and lengths along its rotational axis, and could be made of different materials.

3. Band

The flexible band 30 (e.g. steel of the type A-36) is wrapped around drum 20. A frictional layer 36 is along the drum-side of band 30. See FIG. 17A. One end 34 of band 30 is anchored to brackets 16 on frame 12. The other end 32 of band 30 is connected to a tensioning actuator 50, also on frame 12. In this example friction material 36 is a woven material with a coefficient of friction on the order of $\mu=0.5$ (e.g. product #Bremskerl 4500 from Bremskerl—Reibbelagwerke Emmerling GmbH & Co. KG, Estorf, Germany). A variety of friction materials are possible. Ideally they should be durable to withstand multiple events. Materials such as used in other band brake type applications (e.g. ship mooring) would be candidates.

An intermediate portion of band 30 is wrapped around drum 20. While the amount of wrapping can vary, if opposite band ends are anchored at or near the plane of frame 12, the wrapping could be in the range of at least approximately 180 degrees to close to 360 degrees (single wrap). In this embodiment, band 30 is wrapped over 360 degrees (double-wrapped) resulting in a range of approximately 540 to approaching 720 degrees; and in particular on the order of 630 degrees. Band 30 has the flexibility and material characteristics to wrap tightly around the exterior of the drum and withstand a range of forces, some being substantial.

The length and configuration of band 30 (FIGS. 17A-C), allows for more surface area of band 30 relative to the exterior of drum 20 than either a single band or single wrap. FIG. 17B shows how band 30 can be wrapped essentially almost two revolutions around drum 20 (on the order of 630 degrees). In this example, band 30 is steel of approximately 0.125" thick. Sections of band 30, as well as U-shaped connectors at each distal end (see reference nos. 33 and 35), allow pins (e.g. of the type of pin 46 of FIGS. 20A and B) to connect frame connections 16 for the double ends 34 of band 30 and to the actuator 50 for the single end 32 of band 30, as will be further described further below. It is also to be understood that the inner side of band 30 includes the frictional material. This friction side 36 can be any of a variety of materials. It can be a layer that is bonded or otherwise attached.

Still further, sections of band 30 and attachments 33 and 35 can be welded, screwed, bolted, or otherwise robustly connected. An adjustment technique for attaching the double-ends 34 of band 30 to frame 12 can be used. As shown in the drawings (see, e.g., FIGS. 14A-E), bolts and nuts 17 (or other mechanisms) can allow some range of adjustment of the anchored position of each double-end 34 relative to frame 12 to promote an even wrap around drum 20.

As can be appreciated by those skilled in the art, there is no requirement that band be wrapped any specific amount around the drum. It could be wrapped a fraction of the drum circumference or more than the 630 degrees described above. Attachment points to the frame would have to be appropriately adjusted or configured.

The band could be a single strip between opposite ends. It could be double, triple, or more parallel strips. It could have a single strip portion and branch out into more than two portions. It can be made of different materials but they must be designed to withstand the level of forces indicated in the descriptions herein. A frictional layer can be glued and/or riveted to the band. Other attachment methods may be possible so long as they maintain the lamination over the range of forces that will be experienced.

Examples of the coefficient of friction for the band or the frictional layer of the band are given herein. It is to be understood that designer can select and configure the components for a coefficient of friction that is needed or desired, and that it can vary widely.

4. Actuation Mechanism

Actuation mechanism 50 can tighten or relax band 30 on drum 20. As band 30 is tightened on drum 20, pressure is applied to frictional lining material on band 30 and a friction force is developed which opposes rotation of drum 20. A mechanical advantage can be estimated based on the coefficient of friction of the band friction material and how much of the band is wrapped around the drum. For example, in the case of a 12 inch diameter drum, a band wrap of 630 degrees around the drum, and a friction material coefficient of friction of $\mu=0.5$, a 1 lb. of input force via a building brace attached 2 inches from the pivot axis of the drum and the load being applied perpendicular to the bracing, can result in a reaction force of 728 lbs. This represents a mechanical advantage of 244.

Actuation mechanism 50 can take different forms. It is to be understood that the functionality of actuation mechanism 50 can be accomplished in a wide variety of ways. Its basic function is adjustable tension on one end of the friction band. The amount of tension can be controlled.

As can further be appreciated, the mechanism would be selected based on a variety of factors. One would static load capacity. Typically this would include the ability to withstand a range of static loads at applied tensions to the band for a given damping application. Another would be dynamic load capacity. Typically this would include the ability to withstand a range of dynamic loads experienced during damping.

For adjustable tensioning, there typically would be a controllable actuator or drive technique robust enough and with enough force to tension the band wrapped on the drum over a range. Examples of the magnitude of forces in play are given elsewhere in this description. As is appreciated by those skilled in the art, the range of forces can vary according to need or desire. There are a wide variety of commercially available actuators and mechanical advantage techniques to accomplish the same.

The designer would take into account at least cost, space constraints, forces likely to be experienced, and control methods in selecting the components. Those selections would relate to not only installation and setup (original setting of the tightening of the band on the drum), but also ability to adjust that tension, and still further survive at least a predetermined amount of forces if the drum is rotated by the structure or structures it is damping. Non-limiting examples are a variety of types of hydraulic, mechanical, and electromechanical actuators that can be controlled over a range of movement for tensioning the band.

Similarly, control of the actuating mechanism can take a variety of forms and embodiments. Some actuators could have integrated controls. For example, a linear hydraulic actuator could have an integrated hydraulic pump and power source and be controlled at the actuator. Others could have a control connectable to the actuator via hydraulic lines, electrical conduits, or mechanical linkages. Those skilled in the art can select a control system based on need or desire. It could also involve remote control in the sense that, if desired, a control could be placed away from the actuator (inches, feet, or more). The authorized operator could then more conveniently adjust tensioning. It could even take the form of some sort of wireless control. It could even be from a remote control center connected in wired, wireless, or combined fashion from somewhere else in the structure, near the structure, or miles away from the structure. As indicated, sensors could be integrated with device 10 and provide feedback correlated to amount of tension. That feedback could be communicated to a display or some intelligent controller (e.g. microcontroller, microprocessor, pc, etc.). An authorized operator could monitor sensed tension and make desired adjustments. That sensing can also allow a record of tension on device 10 over any time period (e.g. sensor readings taken continuously, each minute, each hour, each day, or otherwise) for purposes of record keeping, monitoring, or research regarding the nature of structure movement. A few non-limiting examples follow.

In embodiment of FIGS. 1 and 14A, mechanism 50 comprises a hydraulic linear actuator, mounted to frame 12, that uses hydraulic power to operate a hydraulic pump/cylinder combination 62 (FIG. 14D) to pivot one end of lever assembly 52 on pillars 18.

FIGS. 14A-E show additional details of how actuator 50 is used to create variable tension on band 30 when installed. Plates 18 on frame 12 support the pair of L-shaped arms of lever 52 (see side view of one at FIG. 19). A pivot pin, for example, like pin 46 of FIGS. 20A and B, extends through center apertures 54 of each lever arm and through aligned apertures of plates 18 on frame 12 (and, e.g., held in place by ring clips 41—see FIGS. 15A-C and 21). One set of ends of lever arms 52 include apertures 56 (see FIG. 19) that use a pin 46 to attach bracket 33 of the single end of band 30. The opposite ends of lever arms 52 include apertures 58 (FIG. 19) to receive a pin/nut member 40 (shown assembled in FIG. 21 and disassembled in FIGS. 22A-D).

Load cell 64 is fixed to the top surface of frame 12. Hydraulic actuator 62 is mounted on top of load cell 64. Externally threaded rod 60 extends from hydraulic actuator 62 upwardly through the complementary threaded internal bore 45 in the nut portion 44 of the pin/nut combination 40 (shown inverted in FIG. 21). Pin/nut combination 40 includes nut 44 mounted (e.g. welded) along the side of main pin portion 42, in alignment with its through-bore 43.

As seen in FIGS. 14A-E, hydraulic actuator 62 would be connected to a source of hydraulic power (illustrated schematically at reference number 67 in FIG. 14B). Operation of hydraulic cylinder 62 would move threaded rod 60 linearly in either direction along the long axis of rod 60. This would cause pivoting of lever arms 52 around their pivot axis depending on direction (up or down) of screw 60 movement. This would adjust tension on single end 32 of band 30.

Because load cell 64 holds hydraulic actuator 62 and screw 60 to frame 12, a control circuit or controller 68 (FIG. 14B) could monitor the output of load cell 64 to know the amount of tensioning force on band 30.

This allows controlled and variable adjustment of tension on band 30. Cylinder 62 would be controlled to move threaded rod 60 along the direction indicated by the double-ended arrow above rod 60 in FIG. 14D. When assembled, as shown in FIG. 1, nut 44 would be threaded down upon rod 60. It would be fixed against longitudinal movement relative to rod 60 by its threads 45 intermeshing with the threads of rod 60. A controller would operate a hydraulic pump to move rod 60 linearly up or down. This would, in turn, pivot the lever assembly. Thus, using the mechanical advantage of hydraulic cylinder 62, a lever arm can be pivoted around a stationary pivot, which would tension band 30 when rod 60 is extended upwardly, and relax band 30 when cylinder 62 retracts rod 60 downwardly. An additional nut 61 (see FIG. 14A) underneath nut 44 of pin assembly can be used to add further resistance to longitudinal movement of nut 44 on rod 60 when applying tensioning force on band 30.

One example of a commercially-available hydraulic linear actuator is model RSM-50 from Enerpac of Menomonee Falls, Wis. (USA). A hydraulic linear actuator provides the opportunity for relatively large applied forces relative to power input. Load cell 64 can be any of a variety (e.g. model #41/572-05 from Sensotec Sensors/Honeywell, Columbus, Ohio (USA)).

An alternative example 50' of a tensioner for the band of BFRD 10' is illustrated at FIG. 29. Instead of the lever-based actuation mechanism 50 described regarding FIG. 1, a linear actuator 62' alone, such as shown in FIG. 29, could be substituted. As can be seen by comparison to FIG. 1, FIG. 29 shows that the piston arm 63 of hydraulic cylinder 67' moves in the directions of the double-ended arrow in FIG. 29 to pull connector 33 to one end of the band 30 closer or relax it by moving it farther away.

A linear hydraulic actuator, such as an Enerpac RSM-50, is essentially a hydraulic jack. It pushes or pulls arm 63 like a connecting rod. The same would be true of rod 60 in the embodiment of FIG. 14A. In that case the linear actuator pushes or pulls rod 60 to pivot the lever arm.

Other types of linear actuators are, of course, possible and commercially available.

A possible alternative to linear actuation would be to substitute a rotary motor or screw drive for the hydraulic linear actuator of FIGS. 1 and 14A. Instead of hydraulic cylinder 62 to move rod 60 along a vertical axis, some sort of rotary actuator (e.g. hydraulic, electrical, electromechanical or other) could hold threaded rod 60 fixed in space but rotate it in either direction in threaded bore 45 of pin assembly 40. Essentially this would use rod 60 as a lead screw and threaded nut 44 as a lead or traveling nut that moves up or down on rod 60 depending on direction of rotation of the motor or actuator. The lever arm ends pinned to pin assembly 40 would therefore move up and down with traveling nut 44. The opposite ends of the lever arms are connected to the slack end 32 of band 30. Operation of such a hydraulic rotary actuator rotates the lead screw 60 in either direction under some control. Depending on rotation direction of the lead screw 60, the ends of the lever at lead screw 60 are moved either up or down along the lead screw. If moved up, the proximal end of the lever also moves up but the distal end moves down. This pulls on the band 30 and supplies increasing applied force to band 30. If moved down, the opposite occurs. In this manner, via appropriate motor and control, variable applied force can be presented to the band-brake apparatus 10 (see, again, FIGS. 7A-C). A screw drive can give significant mechanical advantage if rotated by the drive mechanism. This can be achieved by using either a rotating hydraulic motor or a continuous rotation hydraulic rotary actuator such as are commercially available. It shall be understood that a rotary actuator or a hydraulic motor would require a pump and a controller. Other rotary or screw drives are possible.

As indicated in FIG. 1, a load cell can be mounted between frame 12 and actuator 50. It can feed back to a controller the measured load so that the controller is informed of the applied force presently provided.

Additionally, other techniques of generating an applied force on band 30 are possible. Examples include, but are not limited to compressed air screw actuator, geared actuator, and piezoelectric actuators.

C. Operation

In its general form, this embodiment is essentially a band brake type frictional brake. An example of a band brake for large ship mooring is shown at U.S. Pat. No. 1,413,292, incorporated by reference herein. However, in this embodiment, one end of the band is fixed to a frame which is, in turn, fixed to a building base or foundation; the opposite end can be controlled to provide a designed amount of applied force. The drum or wheel of the band brake would be operatively connected to a bracing of the building. The connection would be such that if the bracing, fixed and rigid, responded to moving of the building, it would attempt to rotate the drum. Rotation of the drum would be met with frictional resistance of the wrapped band.

Operation would be similar if applied to other structures.

D. System

A system for use and implementation of the BRFD would be mounting the device relative the building in a fixed manner. As indicated at FIGS. 2A and 2B, BRFD 10 can be incorporated into a building (such as buildings 100 or 100' in FIGS. 13A and 13B) by tying into bracing in the building.

FIGS. 2A and 2B show two specific bracing configurations. Others are possible so long as they translate building movement to rotary movement at the BRFD drum.

Next would be controlling the frictional element of the device so that it presents an initial level of frictional resistance against rotation of the drum of the device. This can be adjusted, according to need or desire, over a range, by operation of actuator 50. The drum would be connected or tied to the structure in a manner that would attempt to rotate the drum on movement of the building at least in one direction.

The benefits of such an arrangement over other state-of-the-art methods, including an automobile drum brake type style, will be discussed below.

For example, an automotive drum brake type brake is limited to less than 360 degrees of contact between drum and brake shoes (e.g. usually on the order of 270 degrees), which limits the effect of its self-energizing capacity. Building movement typically oscillates which reverses bracing forces, which require the brake shoes to shift alignment resulting in period of time with no bracing forces. Sustained braking with typical woven friction material relative to the brake shoes, applying forces generally normal to the rotating drum tend to compress or bind the material. As such they can require substantial maintenance, repair, or replacement, or could result in much decreased performance or even failure of the brake.

In contrast, the band brake type BRFD system as described above includes these types of benefits:

a. Dual wrapping can achieve on the order of 630 degrees for friction material, greatly increasing the self-energizing factor.

b. No repositioning of shoes is needed during reversal of bracing forces.

c. Woven material can be used for the friction material.

d. Cooling of the friction material is greatly increased.

e. Band brake type assemblies are relatively easy to manufacture, assemble, and install, including in large diameters.

It is to be understood that BRFD 10 can be implemented as the sole damping device (whether a single BRFD 10 or plural BRFDs 10). But as diagrammatically illustrated in FIGS. 2A and 2B, BRFD 10 can be implemented in parallel or addition to other damping devices 120. FIGS. 2A and 2B show separate damper 120 (with hydraulic piston 124) (in dashed lines as an option). By design, one way to use the parallel dampers 10 and 120 is as follows.

Hydraulic damper 120 (could be plural dampers 120) could be configured to damp normal building movement. An example would be normal wind events that cause some building movement. Such hydraulic dampers are relatively simple and economical, especially for those events.

BRFD(s) 10 could be configured to damp abnormal events. An example is a seismic event. The applied force could be pre-set to a value determined based on design considerations of the structure and the device for such purposes. For example, in the designer deemed acceptable, the applied force could be preset to apply a contact pressure at the friction material of 45 lbs/in$^2$. This could vary, however, according to need or desire.

Thus, a dual damper system (damper(s) 120 and damper(s) 10), both relatively economical, could cooperate in this fashion for a long-lasting damping solution over a range of forces causing building movement; both normal and abnormal.

E. Supplemental Description of BRFD

For further understanding of aspects of the invention, additional discussion of BRFD 10 is set forth below, including technical underpinnings and design/operational characteristics. Reference to FIGS. 1-22A-D will also be made in this description. This discussion will allow the reader to better understand the principles of operation and how the design could be varied for different applications.

Introduction

As mentioned earlier, passive supplemental damping devices have become widely accepted in structural engineering for natural hazard mitigation. However, they are typically only applicable to a limited bandwidth of excitations because their damping forces cannot be varied post manufacturing. Active dampers are possible alternatives to provide higher mitigation performance. Nevertheless, they require large external power sources that may not be available during or after a natural hazard, have the potential to destabilize a system, and can be expensive to operate during sustained wind events. Connor and Laflamme (2014) (for this and other citations that follow, see References section infra.).

Semi-active damping strategies combine some of the benefits of passive and active strategies. They are purely reactive systems, in the sense that they cannot add energy to the control system, and can alter their mechanical properties to provide additional controllability using a fraction of the power required by active strategies. Semi-active devices are divided into four classes: variable stiffness (see, e.g., Liu et al. (2008); He et al. (2001)), variable orifices (see, e.g., Yang et al. (2007)), variable fluid (see, e.g., Yoshida and Dyke (2004)), and variable friction (see, e.g., Spencer Jr and Nagarajaiah (2003)) devices. Citations here and throughout are itemized in the References, infra. and incorporated by reference in their entireties.

In particular, variable friction devices are capable of high energy dissipation, independent of velocity by dissipating mechanical energy into heat via a friction force that is controlled by an actuator varying the normal force. Examples of actuators used in variable friction devices include pneumatic (see, e.g., Vesselenyi et al. (2007), Mehmood et al. (2011)), hydraulic (see, e.g., Kannan et al. (1995)), electro-magnetic (see, e.g., Lorenz et al. (2006), Yang and Agrawal (2002)), electro-mechanical (see, e.g., Narasimhan and Nagarajaiah (2006), Kawamoto et al. (2008), and piezoelectric (see, e.g., Chen and Chen (2004), Lu and Lin (2009), Durmaz et al. (2002), Xu and Ng (2008)). This controllability of the normal force minimizes obstacles found in passive friction devices, namely the response produced by the strong nonlinear behavior, degradation of sliding interface, and cold weld (see, e.g., Mualla and Belev (2002), Symans et al. (2008)).

Literature counts several examples of working variable friction prototypes for structural control applications. Agrawal et al. (Agrawal and Yang (2000)) studied a semi-active electromagnetic friction damper, which consists of one friction pad and two steel plates, with a demonstrated 25 kN (5.5 kips) maximum force. The normal force was adjusted by changing the electric current supplied to the plates. Ref. Narasimhan and Nagarajaiah (2006) introduced the semi-active independently variable friction device, with a 25 kN (5.5 kips) maximum damping force provided by an electromechanical actuator. Reference Lu and Lin (2009) investigated a piezoelectric friction device (PFD) of 0.5 kN (2.2 kips) damping capacity. More recently, Dai et al. (2012) developed an electromagnetic friction damper device (EFD) of 1.1 kN (0.25 kips) damping capacity.

Despite these significant efforts to produce semi-active friction devices suited to structural control applications, combined with studies demonstrating their economic advantages over passive systems (see References Laflamme et al. (2011b); Karavasilis et al. (2012); Chae et al. (2013) for instance), their implementation has remained limited. This could be due to low damping capability and the lack of mechanically reliable technologies of the available technologies Cao et al. (2015).

In an effort to provide both a high damping capacity and high mechanical reliability, recently proposed was a variable friction device based on an automotive dual servo drum brake technology. The technology, termed the Modified Friction Device (MFD) was theoretically presented and a prototype fabricated and demonstrated in Reference Cao et al. (2015). While the prototype was a small scale version constructed from a 200 mm (8 in) automotive duo-servo drum brake, a key feature found in the experimental verification was a discontinuity of the friction dynamics when the rotation reversed due to the internal layout of the braking shoes and bracing pins. This discontinuity led to a sharp reduction in the damping force provided during a substantial portion of a damping cycle. Under specific conditions of limited displacement, the damper was found to provide very limited damping force, irrespective of the input force. The maximum damping force obtained from the prototype was 3.1 kN (0.7 kip).

The present invention relates to a different rotating variable friction damper based on band brake technology. The device, termed Banded Rotary Friction Device (BRFD), is designed to provide a maximum damping force of one order of magnitude higher than, while overcoming the limitations found in the dynamics of the MFD. The following discussion presents the BRFD, and experimentally verifies its performance. The 3-stage dynamic model developed in Reference Cao et al. (2015) is used to characterize its behavior.

The discussion is organized as follows. The next section introduces the BRFD and provides its theoretical background. The subsequent section presents the 3-stage dynamic model used in the characterization of the device's dynamic behavior. The following section discusses the experimental methodology and the prototyping of the BRFD, and presents and discusses experimental results. The last section concludes by providing a summary of the findings.

Banded Rotary Friction Device

Figure 3:
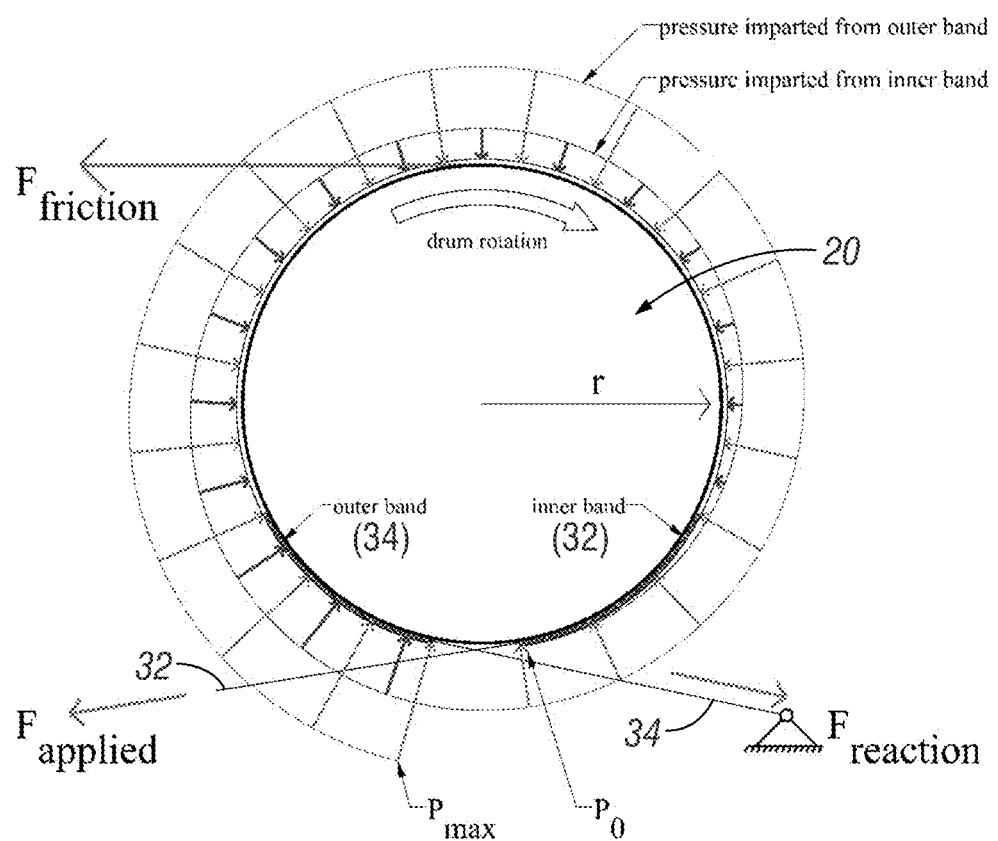
FIG. 3 is a schematic diagram of forces acting on the BRFD of FIG. 1 when installed, for example, in either configuration of FIGS. 2A and B.

The BRFD is based on existing band brake technology. A band brake is a robust and reliable technology capable of providing dependable and predictable braking forces, having seen extensive use in mining and marine mooring applications Rauscher (1922); Han et al. (2011); Johnson and Lucker Jr (1984). The BRFD is a double band brake system, which consists of a band lined with a friction material, doubled wrapped around a drum as shown in FIGS. 1 and 3. It is capable of providing variable braking torques as a linear function of an applied force, which is significantly amplified by the brakes positive servo effect.

A 45 kN (10 kips) capacity prototype 10 was fabricated based on the schematic shown in FIG. 1. The band 30 is wrapped 670 degrees around a steel drum 20, and anchored at both ends 32 and 34 (see FIGS. 17A-C). One end 32 of the band contains an actuation mechanism 50 consisting of a threaded rod 60 for the purpose of varying the force applied to the band brake 10. The prototype 10 has been designed to be installed within a structural bracing scheme 78. Such implementation scheme is discussed in what follows.

Implementation within a Structural System

The BRFD 10 is designed to transform axial displacement into a rotation θ. The device 10 can therefore be integrated within a multiplicity of structural control schemes, including hybrid base-isolation systems, semi-active tuned mass dampers, and bracing elements. FIGS. 2A and B show the BRFD 10 installed in two possible configurations. FIG. 2A is a chevron system 80 that transduces interstory drift δ (via brace members 82 and 84) into rotation θ of the BRFD via the addition of a connecting link 70. FIG. 2B is a toggle bracing configuration 90. The toggle bracing (including members 92 and 94) is used in structural motion engineering to amplify the interstory drift Taylor (2000). While more expensive than a typical chevron system, a toggle bracing system would allow the BRFD to reach a maximum frictional force faster and reduce the heat intensity on the friction material, thus increasing the mitigation performance of the device. In both configurations, the interstory drift $\delta=x/H$, where x and H are the lateral displacement of the floor deck and the story height, respectively, is used to obtain an expression for the linear displacement y;

$$y = \theta \cdot r_b \tag{1}$$

where $r_b$ is the distance from the center of the drum to the brace connection. For the chevron configuration where y=x the rotation can be derived as $$\theta = \frac{\delta \cdot H}{r_b} \tag{2}$$

For the toggle configuration, assuming small displacements, it can be shown that Constantinou et al. (2001)

$$y = \frac{\sin(\alpha)}{\cos(\alpha + \beta) r_b} \cdot x \tag{3}$$

or $$\theta = \frac{\sin(\alpha)}{cis(\alpha + \beta)} \frac{\delta \cdot H}{r_b} \tag{4}$$

Equations (2) and (4) can be used in a performance-based design procedure Connor and Laflamme (2014). The following section derives the equations governing the BRFD friction mechanism.

Friction Mechanism

The friction force of the BRFD is generated by the drum rotating through the stationary band. The band is anchored at one end 32 (called the slack end), where an input force ($F_{applied}$) is applied, resulting in a reactionary force ($F_{reaction}$) at the opposite end 34, as shown in FIG. 3. When rotation of the drum 20 is initiated, a friction force ($F_{friction}$) opposing the rotation of the drum 20 is generated, and the band 30 experiences an equal force acting in the opposite direction. This force causes the band 30 to experience an elastic deformation and displacement in the direction of the drum rotation. As the tension in the band 30 increases towards the fixed end 34, the band 30 wraps tightly around the drum 20, creating the positive servo effect, also known as the self-energizing effect. This phenomenon increases the contact pressure of the friction material 36 linearly with respect to the angular displacement from the point of the applied force on the drum Baker (1992). The continuously changing contact pressure between the band 30 and the drum 20 is shown in FIG. 3. The contact pressure increases uniformly from form $p_0$ to $p_{max}$.

For the mathematical model, it is assumed that the outer drum surface has a uniform curvature and the band conforms evenly to the drum surface. The initial asymmetry due to the elastic deformation of the band material is not considered. The forces $F_{applied}$, $F_{reaction}$ and $F_{friction}$ can be related to each other as follows. The relationship between the forces acting on the band ends ($F_{applied}$ & $F_{reaction}$) is expressed as $$F_{reaction} = F_{applied} e^{\mu \phi} \tag{5}$$

where $f$ and $\mu$ represent the band wrap in radians and the friction coefficient of the friction material, respectively. The forces acting on the band are in equilibrium, as shown in equation 6. Using the known relationship between $F_{reaction}$ & $F_{applied}$, equations 7 & 8 can be derived:

$$F_{reaction} = F_{friction} + F_{applied} \tag{6}$$

$$F_{reaction} = \frac{F_{friction} \cdot e^{\mu \phi}}{(e^{\mu \phi} - 1)} \tag{7}$$

$$F_{applied} \frac{F_{friction}}{(e^{\mu \phi} - 1)} \tag{8}$$

As demonstrated in equation 6, the friction force $F_{reaction}$ is independent of the drum radius r. The braking torque T can be expressed as $T = F_{friction} \cdot r$. It generates a damping force $F_{damping}$ $$F_{damping} = \frac{T}{r_b} = \frac{F_{friction} \cdot r}{r_b} \tag{9}$$

From Equation 9, the device's mechanical advantage C is derived as:

$$C = \frac{F_{damping}}{F_{applied}} = (e^{\mu \phi} - 1) \cdot \left(\frac{r}{r_b}\right) \tag{10}$$

where $F_{damping} > F_{applied}$ Avallone et al. (1996). The mechanical advantage C is a function of the constants $f$ (expressed in radians), $\mu$, r and $r_b$. It follows that $F_{damping}$ is a linear response of $F_{applied}$ amplified by the constant C.

Figure 4:
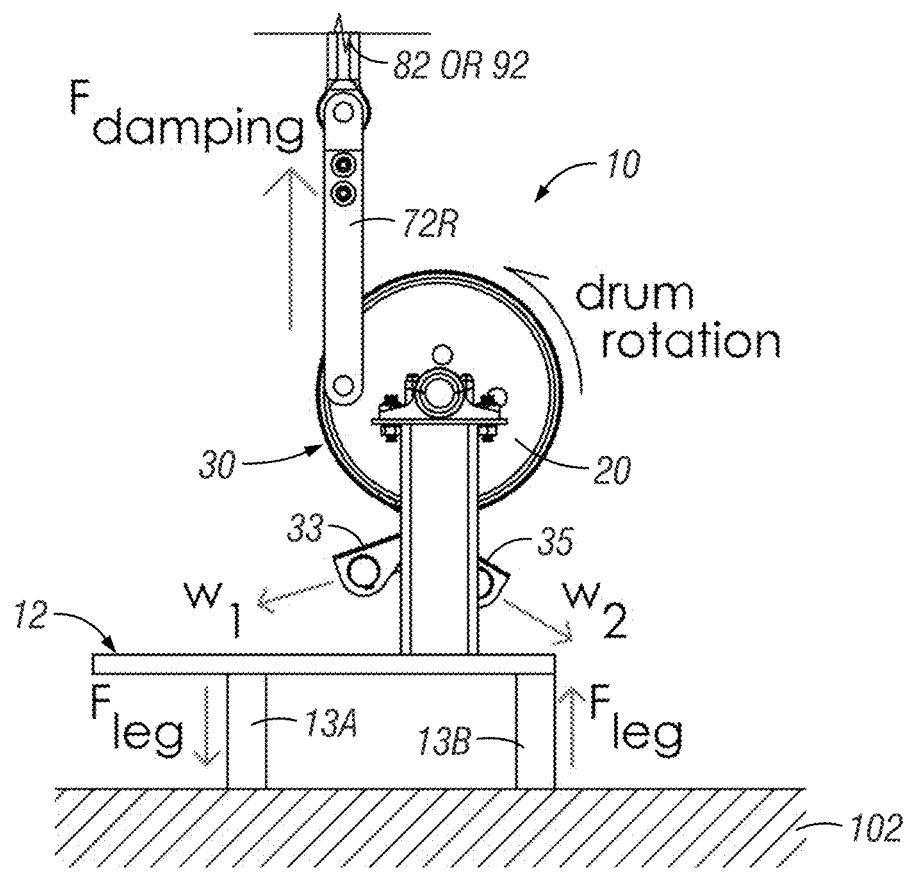
FIG. 4 is a side elevation schematic of the BRFD of FIG. 1.

A schematic of the side view of the BRFD 10 is shown in FIG. 4, where forces $w_1$ and $w_2$ can be either ($F_{applied}$) or ($F_{reaction}$) depending on the direction of rotation of the drum. This design implementation allows for the damper to take advantage of the positive servo effect in both directions of rotation. The BRFD 10 is designed to sit on two support legs 1413A and B that produce opposite forces $F_{leg}$ that counteracts the moment produced by the friction forces on the drum 20, resulting in a zero moment gain in the supporting substructure.

Prototype

A prototype of the BRFD from the schematic shown in FIG. 1 was fabricated to verify its performance at producing high damping forces. The design parameters are listed in table 1. An illustration of the prototype is shown in FIG. 6.

TABLE 1

Design parameters of the BRFD prototype

| Parameter | Value |
|---|---|
| Drum diameter | 0.30 m (12 in) |
| Damping radius ($r_b$) | 0.10 m (4 in) |
| Drum material | A-53 steel |
| Total band brake length | 2.13 meters (84 in) |
| Band thickness | 3.2 mm (⅛ in) |
| Coefficient of friction ($\mu$) | 0.39 |

TABLE 1-continued

Design parameters of the BRFD prototype

| Parameter | Value |
|---|---|
| Band brake wrap | 670° |
| Mechanical advantage (C) | 142 |

Dynamic Model

A 3-stage dynamic model based on a modified LuGre model in Reference Cao et al. (2015) for characterizing the friction behavior of the first generation of rotary damping device (i.e., the MFD) was used. This particular dynamic model was useful at characterizing the drop in force that occurs when the rotation of the drum is reversed. As it will be observed in the experimental results, the BRFD 10 still exhibits a small drop in force upon reversal, and the 3-stage dynamic model still applies. This can be observed in FIGS. 5A and B under "stage 2". This drop in the force is a product of the rearrangement of the device's components and forces caused by the changing direction of the brake drum, termed backlash. Four major sources of backlash in the BRFD prototype are as follows:

1. Elastic deformation of the band that occurs during the initial drum rotation.
2. Deviations of the band from a uniform curvature encasing the drum, causing non-uniformed strain in the metal band;
3. Curvature present where the band connects to the supporting linkage the curvature of the band in the connecting region changes when the force changes from ($F_{applied}$) to ($F_{reaction}$), resulting in an elastic deformation of the band.
4. Deflection of the base and legs supporting the rotating drum.

The 3-stage dynamic model allows for the accurate modeling of the hysteretic behavior, including the stiffness region developed by the BRFD's backlash. FIGS. 5A and B are plots of a typical force loop of the BRFD, divided into 3 stages:

Stage 1 (Node 1 fi Node 2)—The system is in a typical dynamic friction mode. The friction force $F_1$ is characterized using a LuGre friction model. This stage occurs until rotation is reversed and the frictional force is lost.

Stage 2 (Node 2 fi Node 3)—The linear force $F_2$ is characterized as being proportional to a stiffness element $k_2$. This stage occurs over a drum displacement $d_2$. The length of this stage is governed by the amount of backlash present in the device.

Stage 3 (Node 3 fi Node 1)—The force $F_3$ is characterized as being proportional to a stiffness element $k_3$. This stage occurs over a drum displacement $d_3$, after the backlash gap has been taken up by the rotating drum.

The LuGre friction model was selected to characterize the device's 10 friction mode due to its capacity to model the stick-slip motion and the Stribeck effect Olsson et al. (1998). The LuGre model has been applied to a wide range of systems due to its computational simplicity Altpeter (1999); De Wit and Lischinsky (1998); Shiriaev et al. (2003); Lischinsky et al. (1999). Under this model, the friction force is written $$F_{friction} = \sigma_0 z + \sigma_1 \dot{z} + \sigma_2 \dot{\zeta} \tag{11}$$

$$\dot{z} = \dot{\zeta} - \sigma_0 \frac{|\dot{\zeta}|}{g(\dot{\zeta})} z$$

where $\sigma_0$ is a constant representing the aggregate bristle stiffness, $\sigma_1$ is the microdamping, $\sigma_2$ is the viscous friction, z is an evolutionary variable, $\zeta \approx \theta \cdot r$ and $\dot{\zeta}$ are the BRFD's surface displacement and velocity, respectively, and $g(\dot{\zeta})$ is a function used to describe the Stribeck effect $$g(\dot{\zeta}) = F_c + (F_s - F_c) e^{-\left(\frac{\dot{\zeta}}{\dot{x}_s}\right)^2} \tag{12}$$

where $\dot{X}_S$ is a constant representing the Stribeck velocity, $F_s$, is the static friction force, and $F_c$ the kinetic friction force.

A smoothing function is introduced to the transition region between each dynamic stage. It consists of a $C^\infty$ function of the following type Laflamme et al. (2011a):

$$m(x) = \frac{1}{1 + e^{-\frac{\gamma 1(\zeta - \zeta_0)}{\gamma^2}}} \tag{13}$$

where $\zeta_0$ is the reference displacement of the new stage, and 1, 2 are constants. For instance, the total force F during the transition from stage i to stage j is written $$F = (1 - m(\zeta))F_i + m(\zeta)F_j \tag{14}$$

where $F_{i,j}$ is the total force computed using the definition of stage i; j. Note that the amplitude of the damping force of the prototype is not symmetric as a function of the rotational direction. This can be explained by the asymmetries in the friction material and band. A proper break-in procedure should significantly reduce or eliminate the unsymmetrical damping dynamics. Here, the static and dynamic friction force coefficients are separated in between forward ($F_{s;fwd}$ and $F_{c;fwd}$) and backward ($F_{s;bwd}$ and $F_{c;bwd}$) components.

Laboratory Verification

Methodology

The prototype BRFD was mounted in a servo-hydraulic testing machine to characterize its dynamic behavior. A screw-activated tensioner was developed and attached to one side of the band. A load cell was placed under the activation mechanism (FIG. 1) for measuring the applied force and the reaction force upon reversal of the drum 20. The damping force was measured via a load cell located in the head of the testing machine (not shown). The test setup is shown in FIG. 6, with the BRFD in its fully un-actuated position. The testing of the BRFD 10 was limited to its designed 45 kN (10 kips) damping force capacity.

The prototype was subjected to displacement-controlled harmonic excitations of 25.4 mm (1 in) amplitude at four different frequencies: 0.05, 0.1, 0.2, and 0.5 Hz. Five different input forces ($F_{applied}$) were investigated: 35 (8), 53 (12), 66 (15), 133 (30) and 267 N (60 lbs), where 35 N (8 lbs) is the minimum force available from the actuation mechanism and 267 N (60 lbs) corresponds approximately to the maximum capacity. A total of 20 tests were performed.

Model Parameters

The 3-stage dynamic model parameters were identified by minimizing the performance function J, consisting of the fitting error between the estimated force from the model $\hat{F}_{friction}$ and experimental data $F_{friction}$ for each test k:

$$J_k = \|\hat{F}_{friction,k} - F_{friction,k}\|_2 \quad (15)$$

where $\|\cdot\|_2$ is the 2-norm. This minimization was conducted in MATLAB by using the command fminsearch under various arbitrary (and physically realistic) initial conditions. Model parameters set as dependent on the applied force ($F_{applied}$) are the static friction $F_s$, the dynamic friction $F_c$, and the aggregate bristle stiffness $\sigma_0$. Table 2 lists the average values of the application force dependent model parameter, obtained from experimental results. These average values exhibit a linear and amplified response to the force input. This linearity would typically be modeled and used in a model fitting task. However, given the relativity low number of tested application forces, a linear fit of the results produces a high level of error on the estimation of the parameters. Therefore, only the average values listed in Table 2 are currently utilized to fit the experimental values, instead of a function $F_{(c;s);(fwf,bwd)} = f(F_{applied})$ for instance.

TABLE 2

Application force dependent model parameters

| Parameter | 35N | 53N | 66N | 133N | 267N |
|---|---|---|---|---|---|
| Fc, fwd (kN) | 0.805 | 1.91 | 13.3 | 22.7 | 37.3 |
| Fc, bwd (kN) | 0.538 | 0.521 | 3.11 | 13.4 | 37.8 |
| Fs, fwd (Kn) | 0.894 | 2.23 | 14.2 | 23.6 | 39.1 |
| Fs, bwd (kN) | 0.619 | 0.579 | 3.33 | 14.2 | 44.5 |
| $\sigma_0$ (kN·m$^{-1}$) | 525 | 613 | 1490 | 5694 | 9198 | values from Table 2. However, given the variability in the data explained above, there would be an important variability in the experimental C computed for each test. To serve as a preliminary comparison with theory, it is best to use the values at the highest level of force input, for which the band brake is the tightest and its angle is the most constant. For instance, FIGS. 7A-C show the changing band tension for applied forces of 35, 66, and 267 N. The change in force results in a change in the gap between the friction material on the outer bands and the drum. These changes are a function of the force applied to the band end. These frames were taken while the drum was in a backwards (clockwise) rotation, where the two exterior bands are acting as the fixed or reactionary ends.

Table 3 lists the C values for the forward rotation ($C_{fwd}$) and backward rotation ($C_{bwd}$) of the drum, along with the experimental friction coefficient ($C_{fwd}$) derived using Equation 10 for both rotational directions. The experimental results show an agreement with design values. The lower C value for the backward rotation may be attributed to the asymmetries in the metal band and the adhered friction material.

TABLE 3

Validation of design parameters

| Parameter | Test value | Design value |
|---|---|---|
| ($C_{fwd}$) | 145 | 142 |
| ($C_{bwd}$) | 126 | 142 |
| $\mu_{fwd}$ | 0.42 | 0.39 |
| $\mu_{bwd}$ | 0.41 | 0.39 |

Fitting Results

FIGS. 8A-B and 9A-B are plots of the experimental data fitting with the 3-stage model for 0.05 and 0.50 Hz excitations, respectively, under various levels of force inputs (35, 53, 66, 133, and 267 N). The model shows good agreement with the experimental data for all of the applied forces. There is a loss in fitting performance at higher frequency due to chattering in the device. Another notable feature in the 0.50 Hz excitation data is an unmodeled hump that occurs when the BRFD reverses, at a maximum force input (267 N) and less apparently at 133 N. This hump is likely due to an over-tension of the braking mechanism followed by slippage. This hump is likely due to slippage of the friction material due to deviations in the brake band. FIGS. 10A-B compares the responses under various excitation frequencies under a 133 N force input. Results are typical of other force inputs. The model shows good agreement with the experiment data for all frequency, with a decrease in the fitting performance under larger frequencies. This is consistent with the previous results.

Table 4 reports the root mean square error (RMSE) of the fitting results for the 3-stage dynamic model. Results are compared with a pure LuGre friction model optimized following a similar methodology than for the 3-stage model. The listed RMSE confirm the performance of the 3-stage dynamic model discussed above. The pure LuGre model shows similar performance under a 53 N (12 lbs), with a substantially worst performance in the fitting of experimental data for higher load inputs. This comparison demonstrates the necessity to still use the 3-stage dynamic model to characterize the behavior of the BRFD, even though the device was engineered to function in a pure friction mode, due to the device's backlash that is yet to be eliminated.

TABLE 4

Comparison of fitting RMSE

| | 0.05 Hz | | 0.1 Hz | | 0.2 Hz | | 0.5 Hz | |
|---|---|---|---|---|---|---|---|---|
| Force input | 3-stage | LuGre | 3-stage | LuGre | 3-stage | LuGre | 3-stage | LuGre |
| 35 N | 5.96 | 15.4 | 6.98 | 13.3 | 8.81 | 21.1 | 14.3 | 29.3 |
| 53 N | 3.07 | 5.38 | 3.25 | 5.38 | 3.51 | 6.00 | 3.34 | 5.47 |
| 66 N | 4.54 | 44.5 | 2.80 | 40.7 | 2.45 | 55.1 | 4.00 | 100 |
| 133 N | 7.56 | 76.3 | 15.7 | 127 | 44.1 | 46.2 | 27.8 | 117 |
| 267 N | 5.56 | 115 | 9.56 | 58.9 | 12.0 | 40.5 | 22.7 | 126 |

Lastly, FIGS. 11A-B show the modeled force-displacement and force-velocity plots of the BRFD in terms of % force, where 35 N (8 lbs) is taken as 0%. For completeness, various force input results are compared against the modeled dynamic behavior of the first-generation rotary damping system (the MFD) in FIGS. 12A-B. The backlash region is indicated on the figures, along with the dynamic range under maximum force input. The backlash of the BRFD is reduced from 12 mm to 2 mm, while the dynamic range is increased from 5.55 kN to 79.0 kN. This demonstrates that the backlash effect has been substantially minimized, and that the BRFD is capable of producing a one order of magnitude higher damping force.

CONCLUSION

A variable friction damper for structural control applications is presented. The device, termed Banded Rotary Friction Device (BRFD), is based band brake technology. This makes the BRFD a mechanically robust, semi-active damping system. It is capable of providing large damping forces with a substantially lower application force due to its positive servo effect.

A prototype of the BRFD was fabricated and experimentally validated. The dynamic tests were conducted under harmonic loads at different frequencies and application forces. Results show that the prototype BRFD is capable of producing a 45 kN (10 kips) damping force. A 3-stage dynamic model was introduced and model parameters were identified based on test results. Results show that the model could be used to accurately model the dynamic behavior of the device. The experimental value of mechanical advantage shows that the device was capable of a force amplification in the range of 125-150 times the applied force. These numbers showed agreement with theoretical values.

The validated prototype and friction model presented supports the implementation of semi-active friction devices. The BRFD was specifically engineered to minimize the backlash effect and increase the maximum damping force by an order of magnitude relative the MFD. Results showed that the BRFD has been successful at attaining both objectives, therefore making it a mechanically robust device capable of high variable friction force.

REFERENCES (EACH AND EVERY ONE IS INCORPORATED BY REFERENCE IN ITS ENTIRETY)

Agrawal A K and Yang J N (2000) Semiactive control strategies for buildings subject to near field earthquakes: 359-370.

Altpeter F (1999) Friction modeling, identification and compensation.

Avallone E A, Baumeister T and Sadegh A M (1996) Marks' standard handbook for mechanical engineers, volume 9 McGraw-Hill New York.

Baker A K (1992) Industrial brake and clutch design. Pentech Press.

Cao L, Downey A, Laflamme S, Taylor D and Rides J (2015) Variable friction device for structural control based on duo-servo vehicle brake: Modeling and experimental validation. J. Sound and Vibration.

Chae Y, Rides J M and Sause R (2013) Modeling of a large-scale magneto-rheological damper for seismic hazard mitigation. part i: Passive mode. Earthquake engineering & structural dynamics 42(5): 669-685.

Chen C and Chen G (2004) Shake table tests of a quarter-scale three-story building model with piezoelectric friction dampers. Structural Control and Health Monitoring 11(4): 239-257.

Connor J J and Laflamme S (2014) Structural Motion Engineering. Springer. Constantinou M C, Tsopelas P, Hammel W and Sigaher A N (2001) Toggle-brace-damper seismic energy dissipation systems. Journal of Structural Engineering 127(2): 105-112.

Dai H, Liu Z and Wang W (2012) Structural passive control on electromagnetic friction energy dissipation device. Thin-Walled Structures 58: 1-8.

De Wit C C and Lischinsky P (1998) Adaptive friction compensation with partially known dynamic friction model. International journal of adaptive control and signal processing (11): 65-80.

Durmaz O, Clark W W, Bennett D S, Paine J S and Samuelson M N (2002) Experimental and analytical studies of a novel semi-active piezoelectric coulomb damper. In: SPIE's 9th Annual International Symposium on Smart Structures and Materials. International Society for Optics and Photonics, pp. 258-273.

Han D S, Han G J and Choi D H (2011) A study on durability enhancement of band brake for mooring winch. In: Advanced Materials Research, volume 201. Trans Tech Publ, pp. 314-317.

He W, Agrawal A and Mahmoud K (2001) Control of seismically excited cable-stayed bridge using resetting semiactive stiffness dampers. Journal of Bridge Engineering 6(6): 376-384.

Johnson C A and Lucker Jr L H (1984) Mooring apparatus for floating vessels. U.S. Pat. No. 4,446,807.

Kannan S, Uras H M and Aktan H M (1995) Active control of building seismic response by energy dissipation. Earthquake engineering & structural dynamics 24(5): 747-759.

Karavasilis T L, Sause R and Rides J M (2012) Seismic design and evaluation of steel moment-resisting frames with compressed elastomer dampers. Earthquake Engineering & Structural Dynamics 41(3): 411-429.

Kawamoto Y, Suda Y, Inoue H and Kondo T (2008) Electromechanical suspension system considering energy consumption and vehicle manoeuvre. Vehicle System Dynamics 46(S1): 1053-1063.

Laflamme S, Slotine J and Connor J (2011a) Wavelet network for semi-active control. Journal of Engineering Mechanics 137(7): 462-474.

Laflamme S et al. (2011b) Control of large-scale structures with large uncertainties. PhD Thesis, Massachusetts Institute of Technology.

Lischinsky P, Canudas-deWit C and Morel G (1999) Friction compensation for an industrial hydraulic robot. Control Systems, IEEE 19(1): 25-32.

Liu Y, Matsuhisa H and Utsuno H (2008) Semi-active vibration isolation system with variable stiffness and damping control. Journal of sound and vibration 313(1): 16-28.

Lorenz M, Heimann B and Hartel V (2006) A novel engine mount with semi-active dry friction damping. Shock and Vibration 13(4): 559-571.

Lu L Y and Lin G L (2009) A theoretical study on piezoelectric smart isolation system for seismic protection of equipment in near-fault areas. Journal of Intelligent Material Systems and Structures 20(2): 217-232.

Mehmood A, Laghrouche S and El Bagdouri M (2011) Modeling identification and simulation of pneumatic actuator for vgt system. Sensors and Actuators A: Physical 165(2): 367-378.

Mualla I H and Belev B (2002) Performance of steel frames with a new friction damper device under earthquake excitation. Engineering Structures 24(3): 365-371.

Narasimhan S and Nagarajaiah S (2006) Smart base isolated buildings with variable friction systems: $H_\infty$ controller and SAIVF device. Earthquake engineering & structural dynamics 35(8): 921-942.

Olsson H, Åström K J, Canudas de Wit C, Gäfvert M and Lischinsky P (1998) Friction models and friction compensation. European journal of control 4(3): 176-195.

Rauscher (1922) Winch. U.S. Pat. No. 1,413,292.

Shiriaev A, Robertsson A and Johansson R (2003) Friction compensation for passive systems based on the LuGre model. In: Lagrangian and Hamiltonian Methods for Nonlinear Control 2003: A Proceedings Volume from the 2nd IFAC Workshop, Seville, Spain, 3-5 Apr. 2003. Elsevier, p. 159.

Spencer Jr B and Nagarajaiah S (2003) State of the art of structural control. Journal of structural engineering 129 (7):845-856.

Symans M, Charney F, Whittaker A, Constantinou M, Kircher C, Johnson M and McNamara R (2008) Energy dissipation systems for seismic applications: current practice and recent developments. Journal of structural engineering 134(1): 3-21.

Taylor D P (2000) Toggle brace dampers: A new concept for structural control. In: Advanced technology in structural engineering: Proc., 2000 Structures Congress and Exposition.

Vesselenyi T, Dzitac S, Dzitac I and Manolescu M J (2007) Fuzzy and neural controllers for a pneumatic actuator. International Journal of Computers, Communications and Control 2(4): 375-387.

Xu Y and Ng C (2008) Seismic protection of a building complex using variable friction damper: experimental investigation. Journal of engineering mechanics 134(8): 637-649.

Yang J, Bobrow J, Jabbari F, Leavitt J, Cheng C and Lin P (2007) Full-scale experimental verification of resettable semi-active stiffness dampers. Earthquake engineering & structural dynamics 36(9): 1255-1273.

Yang J N and Agrawal A K (2002) Semi-active hybrid control systems for nonlinear buildings against near-field earthquakes. Engineering Structures 24(3): 271-280.

Yoshida O and Dyke S J (2004) Seismic control of a nonlinear benchmark building using smart dampers. Journal of engineering mechanics 130(4): 386-392.

F. Options and Alternatives

It is to be appreciated that the invention can take a variety of forms and embodiments. The foregoing examples are but a few. Variations obvious to those skilled in the art will be included within the invention which is defined solely by its claims.

A variety of options and alternatives have been discussed above. Much of that description includes discussion of general concepts and how they can be implemented in a band brake type damping device for structures. Those skilled in the art will be instructed how band brake type and damping device can be constructed, configured, and applied in a variety of situations. However, for additional examples of options and alternatives, some non-limiting examples are set forth below.

What is sometimes called the frame for the BRFD embodiment is essentially a mounting for the band brake and connection of the opposite ends of the band. It can be a plate, an assembly of different plates or components, or otherwise. It can have mounting interfaces or ability to other structures. It could be a part of another structure or the structure it is damping.

What is sometimes called the base is usually referring to some mass related to the structure being damped or a support for that structure. Non-limiting examples are building foundations, tethers or anchors, pilings such as for bridges, and the like.

It is to be understood that orientation of the BRFD to the structure being damped can vary. In some of the foregoing examples, the BRFD is mounted down at the base or basement of the structure and is connected or tied into the building vertically or obliquely upwardly. However, (e.g. see FIG. 24) it could be lateral or more horizontally tied into a structure (here a bridge). It is to be understood that the relationship or orientations can be in any relationship in xyz space. The BRFD could be above or below or lateral to tie into the structure.

The drum, its rotational support, and its tie-in can vary according to need or desire, as well as its scale.

The band for the drum could take on many configurations. Several have been discussed above.

The tie-in or linkage between the drum and the structure can vary widely. The figures show only a few examples. Such tie-in of the drum to the structure generally relates to changing displacement of the structure to rotation.

Examples of parallel or separate damping systems with which the invention could be used have been discussed. It is to be understood that they could take many forms and embodiments. Hydraulic dampers have been mentioned. However, stiffeners (deformable devices) are possible as are fluid based dampers. Those skilled in the art know the array of different possible parallel dampers. The examples given here are non-limiting to the possibilities. Furthermore, examples have been made as to what magnitudes or types of forces the invention would handle versus the other damper. It is to be understood that the BRFD type device according to the invention could handle one type or magnitude of forces on the structure and the non-BRFD type device handle another magnitude or type of forces on the structure. Those forces could be different, the same, one higher than the other, or one lower than the other. The designer could elect how to make the dampers cooperate and for what conditions according to need or desire.

For example, frictional band or drum brake configurations are possible at various scales and configurations. Single devices 10 can be placed on or at the base of a building or other structure. Single devices 10 can damp at least certain building movements. Multiple devices 10 might be placed on the same base of the same building to damp in different directions. Additionally, devices 10 could be placed at each floor deck of multiple floors. Still further, the specific dimensions and configurations of the band and drum could vary. (A single band instead of the single/double ended band is possible). As indicated earlier, scaling up of the diameter of the drum of the BRFD will increase the damping forces. The increase should be at least roughly proportional. Component materials and configuration may have to be strengthened in kind to accept additional forces. For some applications, the BRFD could be scaled down from that of prototype 10.

Different tensioning actuators are possible. However, it is possible the BRFD could be used without one.

FIGS. 23-29 illustrate other possible alternatives or options. For example, the BRFD could be placed in a building in other locations than at or near a base or foundation. FIG. 23 shows diagrammatically BFRD 10 could be placed at various elevations in the building 100, not just at or near base or foundation 102. This highly diagrammatic schematic of FIG. 23 is intended simply to show that multiple BRFD type devices according to aspects of the invention could be placed in different positions in the same structure or a single such device in various positions relative the structure.

As mentioned, the techniques of the BRFD could be applied to structures other than buildings. A BRFD 10 could be placed at or near footings 202 of a bridge 200 (see FIG. 24). As can be appreciated, the bridge 200 can have a mass that could be normally supported on some piling or base or foundation 202 (which could be separated by isolation bearings such as shown in FIG. 24). Another part of base 202 could support the frames for plural BRFDs 10A and 10B, which could be connected by tie-in linkages 70 to brackets 204 originally connected to the bridge 200.

A BRFD 10 could be operatively installed at the base or foundation 302 of a wind turbine 300. As can be seen in FIGS. 25A and B, BRFD 10 could be fixed to some portion of base 302 and tied in by 70 to the pole of the wind turbine 300. FIGS. 25A and B are shown with the interior of the pole exposed to show placement of BRFD 10 inside it. That portion would normally be covered but there could be an access door to the interior.

BRFDs 10 could be operatively installed at the pilings 402 of an off-shore structure 400. FIGS. 26A and B show an off-shore structure 400 that could support a super structure (one example is a wind turbine 300). Off-shore structure 400 could be supported by pilings 402. BRFD 10 could be mounted on one of those pilings (or a separate frame 302) and have tie-in 70 to the off-shore structure as illustrated. FIG. 26A is a diagrammatic depiction (not to scale) to show the combination. FIG. 26B is an enlargement of the off-shore structure 400 and BRFD 10. An example of a floating off-shore structure can be seen at U.S. Pat. No. 4,457,250, which is incorporated by reference herein.

FIG. 27 illustrates schematically that an off-shore structure 400 could be buoyant or floating. It could be tethered (e.g. by tethers 407) to a piling 402 in the ocean floor. A BRFD 10 could be mounted on piling 402 and/or other support 405 with a tie-in 70 to buoyant submerged pontoons 403.

These illustrate how the BRFD could be implemented in analogous ways to other engineered structures.

FIG. 28 illustrates BRFDs 10 applied to tuned mass isolation systems. As illustrated, these can be applied to structures including but not limited to tall buildings or bridges. A large tuned mass block 500 (often several hundreds of tons in weight) is suspended from a frame. For example, it would be suspended from a frame in the upper floors of a building. In the present state of the art, large hydraulic dampers are used to control motion of the mass in the x-y plane. They can be mounted underneath the mass for direct action or alongside the mass in a diagonal fashion. In many cases, such dampers must have a lock-out mechanism added to keep the mass from moving during an extreme wind event where life safety rather than occupant comfort is needed. Tuned mass isolation systems are more often used for reduction of wind motions than seismic events. BRFDs 10 could be used in place of or to augment performance of hydraulic dampers. Bridges often use moderate numbers of modular tuned mass isolation dampers to reduce vehicle or pedestrian motions on the bridge structure. As illustrated in FIG. 28, plural BRFDs 10 could be used for each tuned mass isolation system. Mounting brackets 504 would connect linkages or tie-ins 70 to the rotating cylinders 20 of devices 10A-D to the mass block 500. As can be appreciated, linkages or tie-ins 70A-D can be connected by brackets 504 to BRFDs 10A-D. Mass block 500 can be suspended on such things as cables 506. An example of a tuned mass can be seen at U.S. Pat. No. 5,560,161, which is incorporated by reference herein.

As mentioned previously, FIG. 29 shows essentially the same BRFD as in FIGS. 1 and 14A. This BRFD 10' differs in that instead of the actuator 50 of those earlier figures, an actuator 50' is utilized. In this example, actuator 50' replaces the band lever arm tensioner of FIGS. 1 and 14A with a simple linear, hydraulic, or screw type actuator such as are commercially available.

What is claimed is:

1. A damping system for an earth-anchored structure having a range of movement, oscillation, or vibration comprising:
   a. a base;
   b. a structure comprising a relatively large load anchored to and above the base, the structure comprising one of: a building, a bridge, a wind turbine, an off-shore structure, a floating off-shore structure; and a tuned mass isolation system;
   c. a fixed mount at, in, or near the structure;
   d. at least one tie-in member connected to a portion of the structure;
   e. a damping apparatus at and operably connected between the fixed mount and the tie-in member, the damping apparatus comprising
      i. a banded rotary friction device wherein the banded rotary friction device comprises:
         1. a band brake comprising;
            a. a drum rotatable with structure directional movement, vibration, or oscillation transferred via the tie-in member to the drum;
            b. a band with a frictional surface wrapped around the drum;
            c. the band having opposite ends each of which is secured to the fixed mount;
   f. so that the one or more of directional movement, vibration, or oscillation of the structure relative to earth is damped by the damping apparatus.

2. The system of claim 1 wherein the band is wrapped around at least a portion of the drum.

3. The system of claim 1 wherein the frictional surface:
   a. is bonded or riveted to the band;
   b. is woven.

4. The system of claim 1 wherein the band comprises:
   a. a first section comprised of a single band;
   b. a second section of two parallel, spaced apart single bands;
   c. wherein the two bands of the second section have distal ends secured to the fixed mount and the single band of the first section has a distal end, opposite the distal end of the second section, which is connected to a variable tension actuator, wherein the variable tension actuator applies variable tangential force to the drum.

5. The system of claim 1 in combination with one or more of:
   a. an inertial system;
   b. a base isolation system;
   c. a tuned mass isolation system;
   d. a second damping system operatively installed relative to the structure.

6. The system of claim 5 wherein the second damping system comprises a banded rotary friction device.

7. The system of claim 5 wherein the second damping system comprises a hydraulic damping device.

8. The system of claim 6 wherein:
   a. the second damping system is configured to damp a first magnitude of forces experienced by the structure; and
   b. the damping system comprising the banded rotary friction device is configured to damp a second magnitude of forces experienced by the structure.

9. A method of damping displacement of an earth-anchored structure having a range of movement, oscillation, or vibration comprising:
   a. a base;
   b. providing a structure comprising a relatively large load anchored to and above the base, the structure comprising one of: a building, a bridge, a wind turbine, an off-shore structure, a floating off-shore structure; and a tuned mass isolation system;
   c. fixing a frame at, in, or near the structure;
   d. changing displacement of the structure into a rotation wherein the step of changing displacement into a rotation comprises:

i. linking the structure to a cylinder, the cylinder having a fixed rotational axis;
  ii. such that axial displacement of the structure causes proportional cylinder rotation; and
e. resisting the rotation with a frictional force generated by the cylinder rotating through a stationary band having opposite ends each of which is secured to the frame;
f. to create a self-energizing, positive servo effect in either direction of rotation to damp the displacement of the structure relative its earth-anchoring wherein the damping is used for:
  i. structural control;
  ii. mitigation of natural disasters;
  iii. wind load; or
  iv. mass loading in or on the structure.

10. The method of claim 9 wherein the linking comprises a connection off-set from the cylinder rotational axis to convert structure movement to cylinder rotation.

11. The method of claim 10 wherein the linking is through one of:
  a. a chevron configuration; and
  b. a toggle configuration.

12. The method of claim 9 the amount of frictional force is controllable based upon characteristics of the band relative the cylinder, the characteristics including:
  a. amount of tension on the band;
  b. surface area of the band relative to the cylinder;
  c. coefficient of friction between the band and the cylinder;
  d. amount of wrapping of the band around the cylinder; and
  e. size of the cylinder.

13. The method of claim 9 wherein the structure comprises a building with
  at least one floor deck spaced above the base.

14. The method of claim 9 further comprising the step of providing additional damping to the structure.

15. The method of claim 14 wherein the additional damping is separate and different from the cylinder rotating through the stationary band.

16. The method of claim 14 wherein the additional damping is adapted to control a first magnitude or type of forces on the structure and the cylinder rotating through the band is adapted to control a second magnitude or type of forces on the structure and/or improve mitigation performance.

17. A damping device for earth-anchored structures having a base and superstructure having a range of movement, oscillation, or vibration relative the base or earth comprising:
  a. a frame having a mounting interface to fixedly mount to the base;
  b. a cylindrical drum having a diameter and rotatably attached to the frame about a longitudinal axis;
  c. a band with opposite ends wrapped greater than 360 degrees around the drum and each opposite end fixed to the frame;
  d. a linking location offset from the longitudinal axis of the drum;
  e. a link arm having a first end at the drum linking location and a second end adapted for connection to the superstructure wherein the superstructure comprises:
    i. a building;
    ii. a bridge;
    iii. a wind turbine;
    iv. an off-shore structure
  and further comprising:
    1. a first connection on a side of the drum which is offset from a rotational axis of the drum;
    2. the link arm between the connection and a distal end;
    3. a second connection at the distal end of the link arm adapted for connection to a structural brace of or to the superstructure;
  f. so that motion of the superstructure is translated into rotational movement of the drum and rotational movement of the drum is damped by a positive servo effect between the drum and the band.

18. The device of claim 17 wherein one of the opposite ends of the band is connected to a variable tensioner.

19. The device of claim 18 wherein the variable tensioner comprises a lever, a linear actuator, and a force sensor, wherein the actuator is controllable to place varying tension on the band and the force sensor is adapted to measure applied force on the band.

20. The device of claim 17 wherein the band is a flexible steel with a friction surface on a drum side, and the opposite ends comprise a single end and a double end, wherein the single end wraps a portion of the drum and the double end wraps on opposite sides of the single end.

21. The device of claim 17 wherein the drum diameter and band characteristics are selected relative to amount of damping force desired.

22. The device of claim 21 wherein the amount of damping force desired is dependent upon at least one of:
  a. superstructure size; and
  b. type of damping.

23. The device of claim 17 wherein the structural brace comprises:
  a. a chevron bracing; or
  b. a toggle bracing.

24. The device of claim 17 in combination with a second damping device adapted for parallel connection to the structure.

25. A damping system for a structure comprising:
  a. a mount at, in, or near the structure;
  b. at least one tie-in member connected to a portion of the structure;
  c. a damping apparatus at and operably connected between the mount and the tie-in member, the damping apparatus comprising
    i. a banded rotary friction device;
  d. in combination with one or more of:
    i. an inertial system;
    ii. a base isolation system;
    iii. a tuned mass isolation system;
    iv. a second damping system operatively installed relative to the structure;
  wherein the second damping system comprises a hydraulic damping device.

26. A damping device for structures having a base and superstructure comprising:
  a. a frame having a mounting interface to mount to the base;
  b. a cylindrical drum having a diameter and rotatably attached to the frame about a longitudinal axis;
  c. a band with opposite ends wrapped greater than 360 degrees around the drum and each opposite end fixed relative the drum;
  d. a linking location offset from the longitudinal axis of the drum;

e. a link arm having a first end at the drum linking location and a second end adapted for connection to the superstructure;
f. so that motion of the structure is translated into rotational movement of the drum and rotational movement of the drum is damped by a positive servo effect between the drum and the band;
   wherein one of the opposite ends of the band is connected to a variable tensioner and wherein the variable tensioner comprises a lever, a linear actuator, and a force sensor, wherein the actuator is controllable to a place varying tension on the band and the force sensor is adapted to measure applied force on the band.

27. A damping device for structures having a base and superstructure comprising:
   a. a frame having a mounting interface to mount to the base;
   b. a cylindrical drum having a diameter and rotatably attached to the frame about a longitudinal axis;
   c. a band with opposite ends wrapped greater than 360 degrees around the drum and each opposite end fixed relative the drum;
   d. a linking location offset from the longitudinal axis of the drum;
   e. a link arm having a first end at the drum linking location and a second end adapted for connection to the superstructure;
   f. so that motion of the structure is translated into rotational movement of the drum and rotational movement of the drum is damped by a positive servo effect between the drum and the band;
further comprising:
   a. a first connection on a side of the drum which is offset from a rotational axis of the drum;
   b. a link arm between the connection and a distal end;
   c. a second connection at the distal end of the link arm adapted for connection to a structural brace of or to the superstructure;
wherein the structural brace comprises:
   a. a chevron bracing; or
   b. a toggle bracing.

\* \* \* \* \*

UNITED STATES PATENT AND TRADEMARK OFFICE
CERTIFICATE OF CORRECTION

PATENT NO. : 9,896,836 B1
APPLICATION NO. : 14/936357
DATED : February 20, 2018
INVENTOR(S) : Austin Downey, Simon Laflamme and Douglas P. Taylor Page 1 of 1

It is certified that error appears in the above-identified patent and that said Letters Patent is hereby corrected as shown below:

On the Title Page

Item [73]:
INSERT --Taylor Devices, Inc., North Tonawanda, NY (US)-- after Iowa State University Research Foundation, Inc., Ames, IA (US)

Signed and Sealed this
Eighth Day of January, 2019

Andrei Iancu
*Director of the United States Patent and Trademark Office*